United States Patent
Miyasaka

[11] Patent Number: 5,845,247
[45] Date of Patent: Dec. 1, 1998

[54] REPRODUCING APPARATUS

[75] Inventor: Shuji Miyasaka, Neyagawa, Japan

[73] Assignee: Matsushita Electric Industrial Co., Ltd., Kadoma, Japan

[21] Appl. No.: 711,930

[22] Filed: Sep. 11, 1996

[30]     Foreign Application Priority Data

Sep. 13, 1995 [JP] Japan .................................. 7-234902

[51] Int. Cl.⁶ ........................................................ G10L 9/16
[52] U.S. Cl. ................................................ 704/267; 704/266
[58] Field of Search .................................... 704/500, 265, 704/247, 229, 211, 216, 266, 267, 268, 263, 264

[56]         References Cited

U.S. PATENT DOCUMENTS 5,216,744  6/1993  Alleyene et al. ..................... 704/265
5,341,432  8/1994  Suzuki et al. ....................... 704/247
5,581,653  12/1996  Todd ................................. 704/229
5,630,013  5/1997  Suzuki et al. ....................... 704/216

*Primary Examiner*—Richemond Dorvil
*Attorney, Agent, or Firm*—Renner, Otto, Boiselle & Sklar, P.L.L.

[57]          ABSTRACT

The reproducing apparatus of the invention reproduces a plurality of band signals which have been subjected to a band division and includes a time-scale modifier which receives the plurality of band signals and time-axis compresses the respective band signals at the same ratio, thereby outputting a plurality of time-axis compressed band signals and a synthesis filter bank for synthesizing the plurality of time-axis compressed band signals.

9 Claims, 16 Drawing Sheets

(a) First half of first band signal (b) Second half of first band signal

Sample length Tf/2

(a) Fade-out processed first half (b) Fade-in processed second half (c) Cross-fade Sample length Tf/2

(a) First half — Sample length Tf/2

(b) Second half — Sample length Tc

Sample length Tf/2

(a) Fade-out (b) Fade-in (c) Cross-fade

REPRODUCING APPARATUS

BACKGROUND OF THE INVENTION

1. Field of the Invention

The present invention relates to a reproducing apparatus for reproducing an encoded signal which has been encoded by an encoding method in which an original signal is subjected to a band division and then the respective band signals are encoded (this method corresponds to a sub-band encoding method, an MPEG1 audio encoding method and the like (see ISO/IEC 11172-3:1993)). More particularly, the present invention relates to a reproducing apparatus for performing "high-speed reproduction processing" by utilizing cross fade processing or decimation processing of a repeating waveform. In this specification, the "high-speed reproduction processing" means "processing for reproducing a sound such that the sound can be replayed at a higher speed without changing the pitch thereof". That is to say, the "high-speed reproduction processing" means processing for reproducing a sound at a speed higher than a reproduction speed in a normal reproducing operation.

2. Description of the Related Art

In recent years, apparatuses for performing a high-speed reproducing operation of an audio signal by utilizing cross fade processing or decimation processing of a repeating waveform have been developed (e.g., an apparatus utilizing cross fade processing is disclosed in U.S. Pat. No. 5,431,432).

However, when the high-speed reproduction processing is performed in accordance with such a conventional method, a pulse code modulated (PCM) signal on a normal time axis is supposed to be input before the high-speed reproduction processing is performed. More specifically, in the case where a band signal subjected to a band division (hereinafter, such a signal will be simply referred to as a "band-divided signal") has been input prior to the high-speed reproduction processing, the high-speed reproduction processing is performed with respect to a PCM signal on a time axis after the band signal is subjected to a band synthesis (hereinafter, such a signal will be simply referred to as a "band-synthesized signal"). On the other hand, in the case where an encoded signal which has been encoded by an encoder in which an original signal is band-divided and then the respective band signals are encoded has been input prior to the high-speed reproduction processing, the high-speed reproduction processing is performed with respect to a PCM signal on a time axis after the encoded signal has been decoded.

That is to say, if the high-speed reproduction of MPEG1 audio encoded data is performed in accordance with the conventional technologies, the high-speed reproduction is performed as shown in FIG. 20.

As shown in FIG. 20, first, the bit stream of MPEG1 audio encoded data is analyzed by a bit stream parser 2001, thereby separating the bit stream into encoded data corresponding to the respective frequency bands. The encoded data corresponding to the respective frequency bands are dequantized by dequantizers 2002, 2003 and 2004, thereby producing respective band signals. Thereafter, the respective band signals are band-synthesized by a synthesis filter bank 2005, thereby obtaining a PCM signal. The PCM signal thus produced is subjected to high-speed reproduction processing by a high-speed reproduction processor 2006, thereby producing a high-speed reproduction processed PCM signal.

SUMMARY OF THE INVENTION

According to the present invention, a reproducing apparatus for reproducing a plurality of band signals which have been subjected to a band division is provided. The reproducing apparatus includes a time-scale modifier which receives the plurality of band signals and time-axis compresses the respective band signals at the same ratio, thereby outputting a plurality of time-axis compressed band signals and a synthesis filter bank for synthesizing the plurality of time-axis compressed band signals.

In one embodiment, the time-scale modifier includes a plurality of frame dividers, each of which receives a corresponding one of the plurality of band signals and divides the received band signal into a plurality of frames such that one frame has a predetermined sample length Tf and a plurality of cross faders, each of which performs cross fade processing with respect to a corresponding one of the plurality of frame-divided band signals by overlapping the band signal by a predetermined sample length Tc.

In another embodiment, the time-scale modifier further includes a reproduction speed detector which detects a reproduction speed F input by a user for setting the sample length Tc based on the sample length Tf and the reproduction speed F such that Tc satisfies a relationship: $Tc = Tf \times (F-1)/F$.

In still another embodiment, the time-scale modifier further includes a correlation function calculator for calculating a correlation value S(n) between a first half and a second half of the frame-divided band signal corresponding to a band, in which pitch components of a sound are included, when the first half and the second half are overlapped in an overlapping range defined by n samples, and each of the plurality of cross faders uses n corresponding to a maximum value of S(n) as the sample length Tc.

In still another embodiment, the time-scale modifier further includes a reproduction speed detector which detects a reproduction speed F input by a user and a correlation function detecting range controller which calculates a sample length Tb satisfying a relationship: $Tb = Tf \times (F-1)/F$ and controls the correlation function calculator to obtain the correlation value S(n) in a range defined by (Tb±m) samples (where m is a natural number).

In still another embodiment, the time-scale modifier further includes a reproduction speed detector which detects a reproduction speed F input by a user and a correlation function detecting range controller which calculates a sample length Tb satisfying a relationship: $Tb = Tf \times (F-1)/F$ and controls the correlation function calculator to obtain the correlation value S(n) in a range defined by (Tb+B±m) samples (where m is a natural number) by using a speed fine control value B (where B is an integer), and the correlation function detecting range controller updates the speed fine control value B by (B+Tb−Tc) every time the correlation function detecting range controller uses n corresponding to a maximum value of the correlation value S(n) as the sample length Tc and an initial value of the speed fine control value B is equal to 0.

In still another embodiment, the time-scale modifier includes: a plurality of frame dividers, each or which receives a corresponding one of the plurality of band signals and divides the received band signal into a plurality of frames such that one frame has a predetermined sample length Tf; a repeating waveform detector which extracts a repeating waveform from a band signal corresponding to a band, in which pitch components of a sound are included, and determines a start point Ts and an end point Te of the repeating waveform; and a plurality of decimators, each of which deletes a signal section between the start point Ts and the end point Te from the frame-divided band signal, thereby time-axis compressing the band signal.

According to another aspect of the present invention, a reproducing apparatus which receives a first band signal and a second band signal on a first channel and a first band signal and a second band signal on a second channel for outputting a first channel output signal and a second channel output signal which have been band-synthesized is provided. The reproducing apparatus includes: a first synthesis filter bank for receiving and band-synthesizing the first band signal and the second band signal on the first channel; a second synthesis filter bank for receiving and band-synthesizing the first band signal and the second band signal on the second channel; a first channel mixer which receives, adds and averages the first band signal on the first channel and the first band signal on the second channel, thereby outputting a mixed first band signal; a second channel mixer which receives, adds and averages the second band signal on the first channel and the second band signal on the second channel, thereby outputting a mixed second band signal; a third synthesis filter bank for receiving and band-synthesizing the mixed first band signal and the mixed second band signal; a high-speed reproduction request detector for detecting a high-speed reproduction request given by a user; a first selector for selectively outputting an output of the first synthesis filter bank and an output of the third synthesis filter bank as the first channel output signal in accordance with the high-speed reproduction request; and a second selector for selectively outputting an output of the second synthesis filter bank and an output of the third synthesis filter bank as the second channel output signal in accordance with the high-speed reproduction request.

According to still another aspect of the present invention, a reproducing apparatus which receives an orthogonal transform coefficient on a first channel and an orthogonal transform coefficient on a second channel for outputting a first channel output signal and a second channel output signal which have been subjected to an inverse orthogonal transform is provided. The reproducing apparatus includes: a first inverse orthogonal transformer which receives the orthogonal transform coefficient on the first channel and performs an inverse orthogonal transform with respect to the orthogonal transform coefficient; a second inverse orthogonal transformer which receives the orthogonal transform coefficient on the second channel and performs an inverse orthogonal transform with respect to the orthogonal transform coefficient; a channel mixer which receives, adds and averages the orthogonal transform coefficient on the first channel and the orthogonal transform coefficient on the second channel, thereby outputting a mixed orthogonal transform coefficient; a third inverse orthogonal transformer which receives the mixed orthogonal transform coefficient and performs an inverse orthogonal transform with respect to the orthogonal transform coefficient; a high-speed reproduction request detector for detecting a high-speed reproduction request given by a user; a first selector for selectively outputting an output of the first inverse orthogonal transformer and an output of the third inverse orthogonal transformer as the first channel output signal in accordance with the high-speed reproduction request; and a second selector for selectively outputting an output of the second inverse orthogonal transformer and an output of the third inverse orthogonal transformer as the second channel output signal in accordance with the high-speed reproduction request.

Thus, the invention described herein makes possible the advantage of providing a reproducing apparatus which performs predetermined processing on band-divided band signals, thereby compressing (or shortening) the length of the time axis at the point of time when the signal has been band-divided and then performs a band synthesis, thereby reducing the amount of processing to be performed as compared with the case of compressing (or shortening) the length of the time axis after the band synthesis has been performed.

This and other advantages of the present invention will become apparent to those skilled in the art upon reading and understanding the following detailed description with reference to the accompanying figures.

DESCRIPTION OF THE PREFERRED EMBODIMENTS

Figure 1:
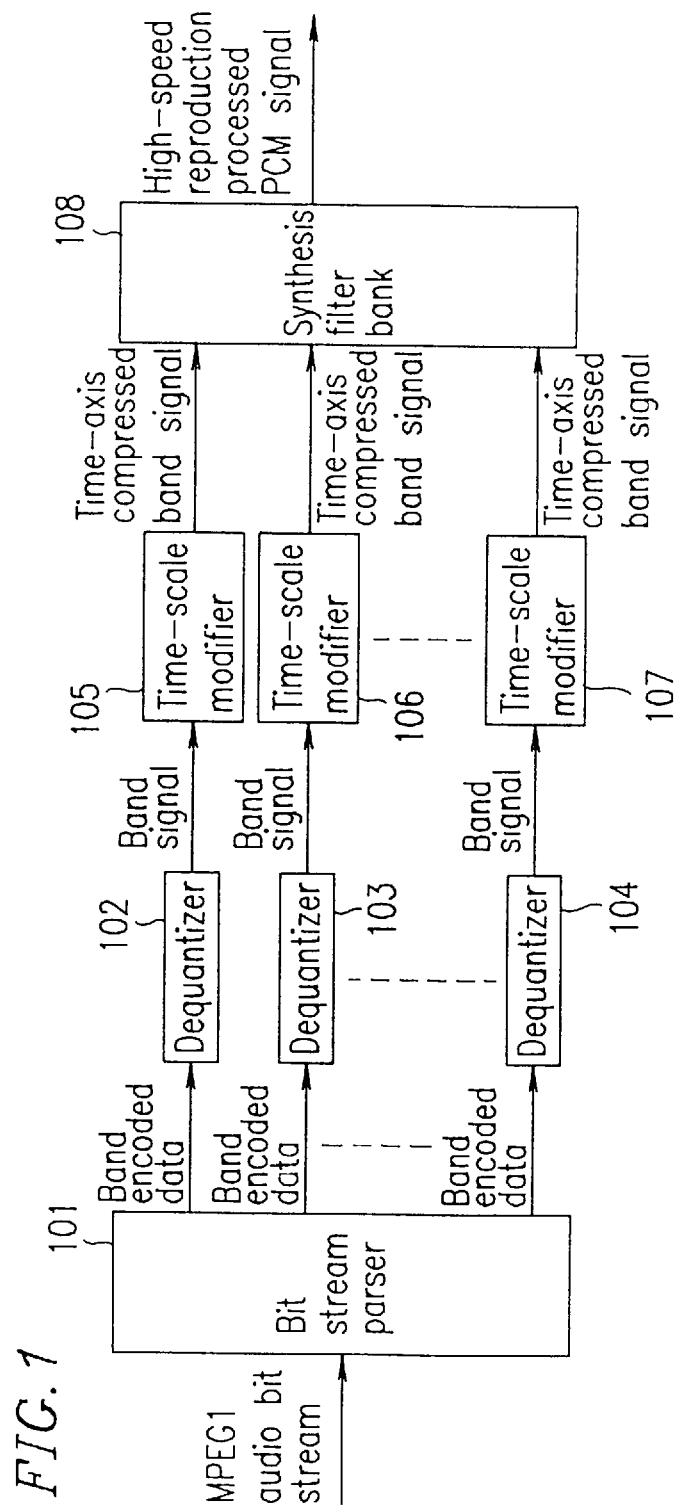
FIG. 1 is a block diagram illustrating a fundamental configuration of the present invention.

FIG. 1 is a block diagram illustrating a fundamental concept of the present invention. As shown in FIG. 1, first, the bit stream of MPEG1 audio encoded data is analyzed by a bit stream parser 101, thereby separating the bit stream into encoded data corresponding to the respective frequency bands. The encoded data corresponding to the respective frequency bands are dequantized by dequantizers 102, 103 and 104, thereby producing respective band signals. Thereafter, the respective band signals are subjected to cross fade processing; the repeating parts of the waveform of the respective band signals are deleted; or the respective band signals are subjected to the combination of the two kinds of processing, thereby producing time-axis compressed band signals by time-scale modifiers 105, 106 and 107. The respective band signals thus produced are band-synthesized by a synthesis filter bank 108, thereby producing a high-speed reproduction processed PCM signal. Though the input bit stream is separated into three data as shown in FIG. 1, the number of resulting band signals is not limited thereto. For example, a bit stream is divided into 32 band signals in accordance with MPEG1 audio encoding method.

EXAMPLE 1

Hereinafter, a reproducing apparatus in a first example of the present invention will be described with reference to the drawings. The first example relates to a high-speed reproducing apparatus utilizing cross fade processing.

Figure 2:
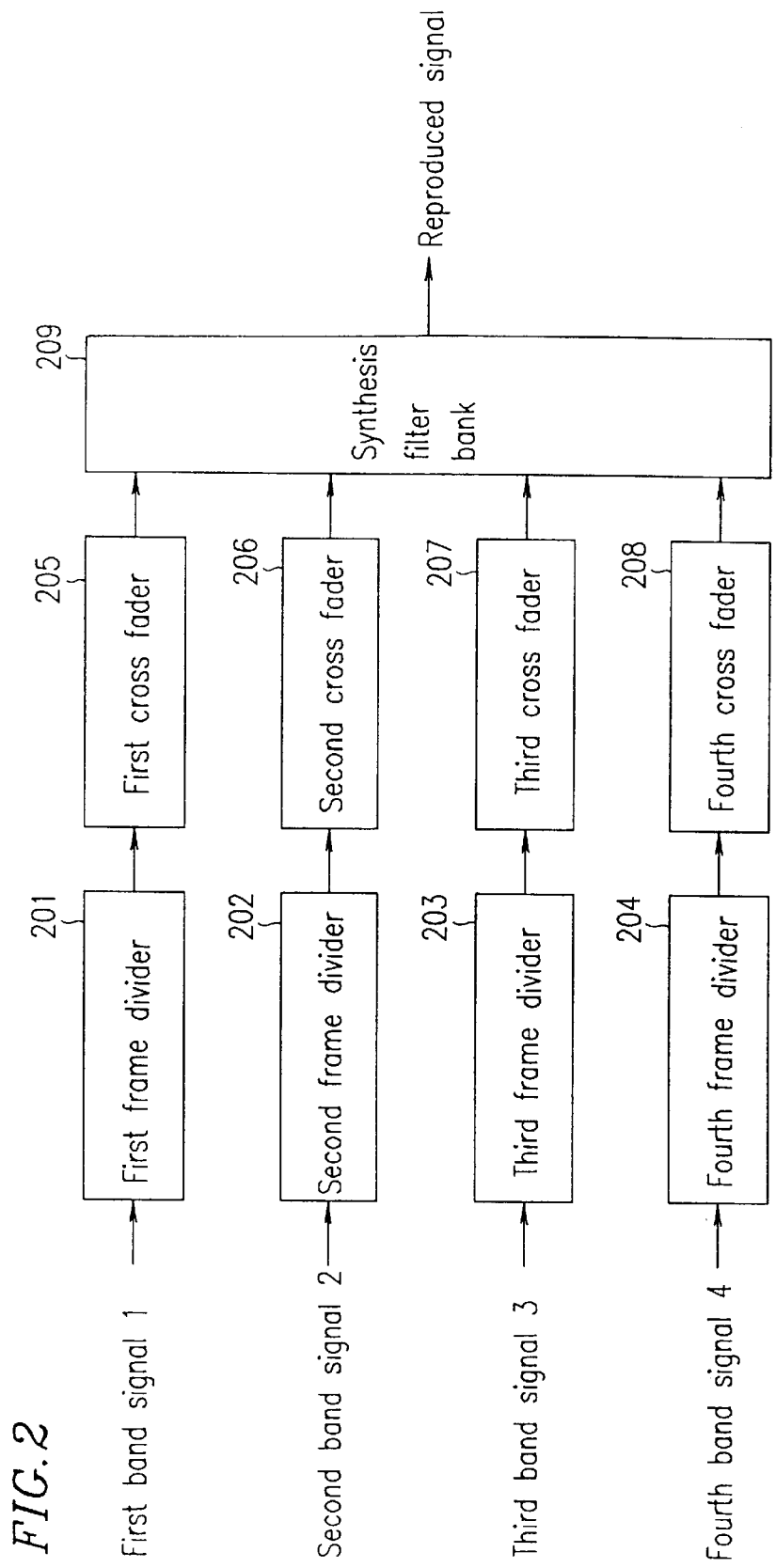
FIG. 2 is a block diagram showing a configuration for a reproducing apparatus in a first example of the present invention.

FIG. 2 is a block diagram showing a configuration for the reproducing apparatus in the first example of the present invention. The block diagram of FIG. 2 corresponds to a case where the configuration shown in FIG. 1 is provided with four bit stream parsers 101. In FIG. 2, the reference numeral 201 denotes a first frame divider for dividing a first input band signal into a plurality of frames and retaining one frame thereof having a sample length Tf; 202 denotes a second frame divider for dividing a second input band signal into a plurality of frames and retaining one frame thereof having a sample length Tf; 203 denotes a third frame divider for dividing a third input band signal into a plurality of frames and retaining one frame thereof having a sample length Tf; and 204 denotes a fourth frame divider for dividing a fourth input band signal into a plurality of frames and retaining one frame thereof having a sample length Tf.

The first to the fourth band signals shown in FIG. 2 are signals output from the dequantizers 102 to 104 shown in FIG. 1, respectively. In addition, the first to the fourth frame dividers 201 to 204 and the first to the fourth cross faders 205 to 208 shown in FIG. 2 correspond to the time-scale modifiers 105 to 107 shown in FIG. 1.

In this specification, a "sample length Tf" means a time Tf times as long as a sampling period. For example, when a sampling frequency fs is 48 kHz (i.e., a sampling period is 20.83 µs) and a sample length Tf is 1152, the "length" (i.e., a time interval) of one frame corresponding to the "sample length Tf" is: 20.83 µs×1152=24 ms. The length of one frame corresponding to this sample length Tf is preferable 10 times as long as one period of an audio signal to be reproduced or longer. For example, when the frequency of an audio signal is 500 Hz, one period thereof is 2 ms, so that the length of one frame corresponding to the sample length Tf is 24 ms. Thus, the length of one frame satisfies the condition that the length should be 10 times as long as one period of an audio signal or longer. A sample length Tf has been herein described. As for a sample length Tc and the like to be described later in this specification, a sampling period is also used as a reference time interval.

In FIG. 2, it is assumed that the first to the fourth band signals to be input are band signals obtained by dividing a signal on a normal time axis into four band signals corresponding to the respective bands by a filter bank which performs a ¼ down sampling (i.e., a sampling for retaining one-fourth of the original samples and discarding or decimating the remaining samples) and that the first band signal is a band signal in the lowest band and the fourth band signal is a band signal in the highest band. In this example, an original signal is assumed to be divide into four band signals, for simplification. However, the number of band signals resulting from the band division is preferably several tens in the primary applications of the present invention. For example, the number of band signals is preferably 32 and each band-divided signal is preferably 1/32 down-sampled, as defined by the MPEG1 audio encoding method (see, for example, ISO/IEC 11172-3:1993).

The reference numeral 205 denotes a first cross fader for performing cross fade processing with respect to the first half and the second half of the first band signal which has been frame-divided and retained by the first frame divider 201; 206 denotes a second cross fader for performing cross fade processing with respect to the first half and the second half of the second band signal which has been frame-divided and retained by the second frame divider 202; 207 denotes a third cross fader for performing cross fade processing with respect to the first half and the second half of the third band signal which has been frame-divided and retained by the third frame divider 203; 208 denotes a fourth cross fader for performing cross fade processing with respect to the first half and the second half of the fourth band signal which has been frame-divided and retained by the fourth frame divider 204; and 209 denotes a synthesis filter bank for band-synthesizing the cross-fade processed band signals corresponding to four bands.

Figure 3:
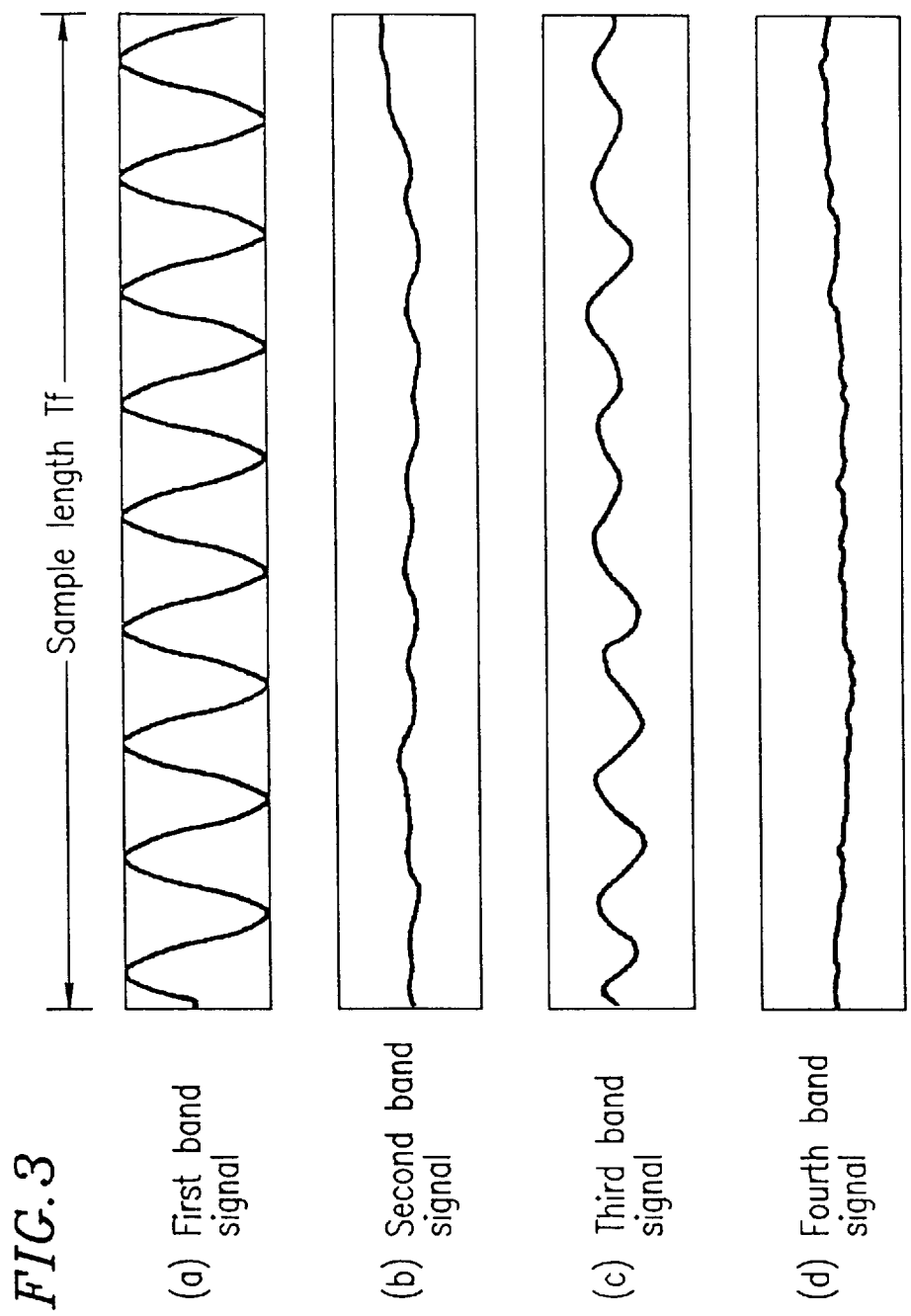
FIG. 3 is a waveform chart illustrating the waveforms of the first to the fourth band signals which have been frame-divided and retained by the first to the fourth frame dividers, respectively.
Figure 4:
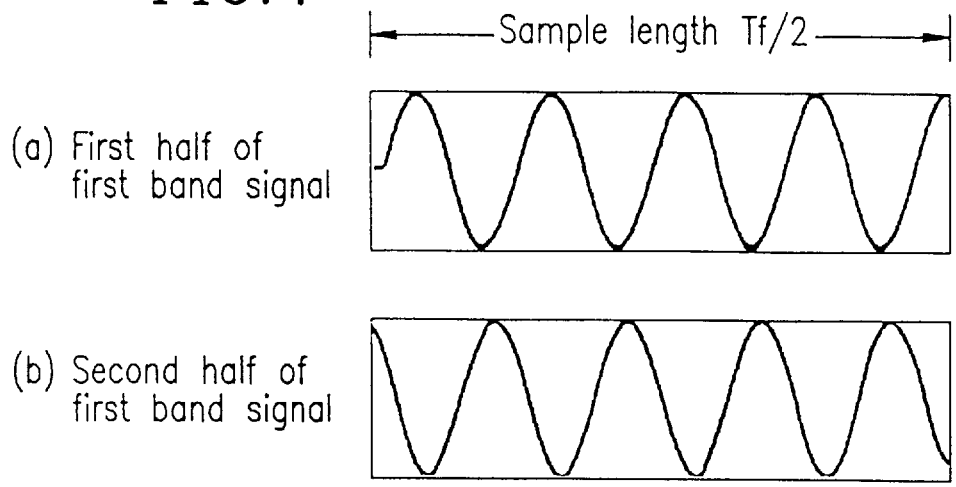
FIG. 4 is a waveform chart illustrating the waveforms of the first band signal which has been frame-divided and retained by the first frame divider, in which portions (a) and (b) correspond to the first half and the second half of the band signal, respectively.
Figure 5:
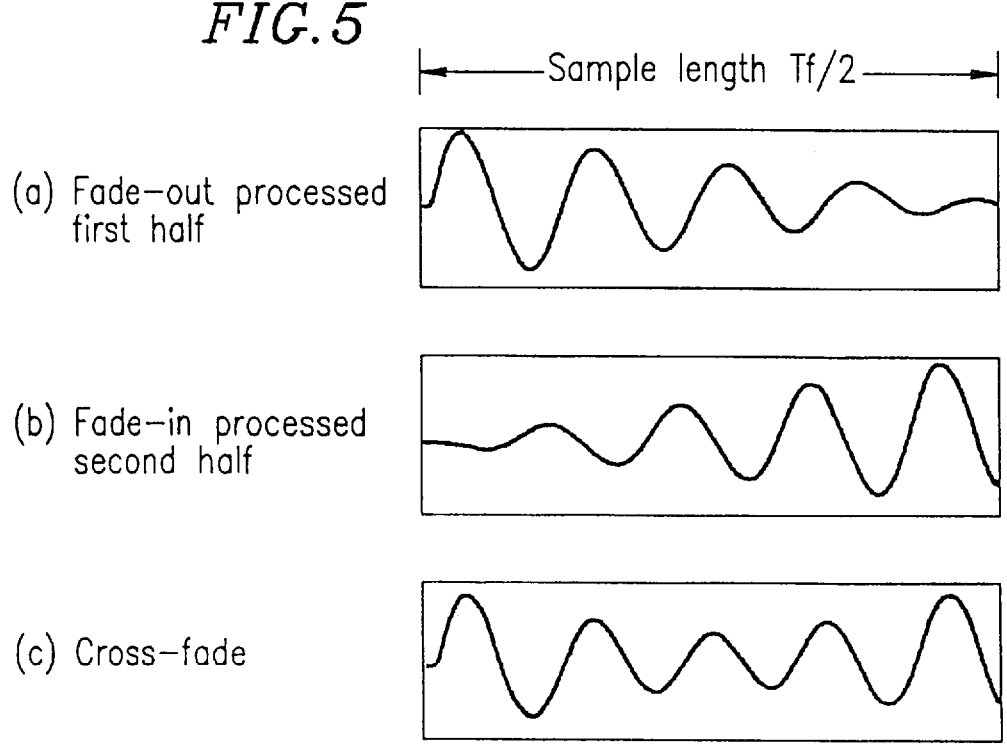
FIG. 5 is a waveform chart illustrating the waveforms of the first band signal which has been frame-divided and retained by the first-frame divider, in which portions (a), (b) and (c) correspond to the fade-out processed first half of the band signal, the fade-in processed second half of the band signal and a signal obtained by subjecting the first half and the second half to cross fade processing, respectively.

FIG. 3 is a waveform chart illustrating the waveforms of the first to the fourth band signals which have been frame-divided and retained by the first to the fourth frame dividers 201 to 204, respectively. FIG. 4 is a waveform chart illustrating the waveforms of the first band signal which has been frame-divided and retained by the first frame divider 201, in which portions (a) and (b) correspond to the first half and the second half of the band signal, respectively. FIG. 5 is a waveform chart illustrating the waveforms of the first band signal which has been frame-divided and retained by the first frame divider 201, in which portions (a), (b) and (c) correspond to the fade-out processed first half of the band signal, the fade-in processed second half of the band signal and a signal obtained by subjecting the first half and the second half to cross fade processing, respectively.

Hereinafter, the operation of the reproducing apparatus having the above-described configuration will be described with reference to FIGS. 2 to 5.

First, as shown in FIG. 2, the input first band signal is divided into a plurality of frames and one frame thereof having a sample length Tf is retained by the first frame divider 201; the input second band signal is divided into a plurality of frames and one frame thereof having a sample length Tf is retained by the second frame divider 202; the input third band signal is divided into a plurality of frames and one frame thereof having a sample length Tf is retained by the third frame divider 203; and the input fourth band signal is divided into a plurality of frames and one frame thereof having a sample length tf is retained by the fourth frame divider 204.

Next, the first cross fader 205 performs cross fade processing with respect to the first half and the second half of the band signal which has been frame-divided and retained by the first frame divider 201; the second cross fader 206 performs cross fade processing with respect to the first half and the second half of the band signal which has been frame-divided and retained by the second frame divider 202; the third cross fader 207 performs cross fade processing with respect to the first half and the second half of the band signal which has been frame-divided and retained by the third frame divider 203; and the fourth cross fader 208 performs cross fade processing with respect to the first half and the second half of the band signal which has been frame-divided and retained by the fourth frame divider 204.

FIGS. 4 and 5 illustrate exemplary cross fade processing. In this example, these figures show how the first cross fader 205 performs cross fade processing with respect to the first half and the second half of the band signal which has been frame-divided and retained by the first frame divider 201. It is noted that the cross fade processing can be similarly performed by the second to the fourth cross faders 206 to 208. FIG. 4 illustrates the waveforms of the band signal which has been frame-divided and retained by the first frame divider 201 when the band signal is divided into the first half (shown in portion (a) of FIG. 4) and the second half (shown in portion (b) of FIG. 4). Portion (a) of FIG. 5 is a waveform chart illustrating the waveform of the first half of the band signal which has been frame-divided and retained by the first frame divider 201 after the first half has been subjected to fade-out processing, while portion (b) of FIG. 5 is a waveform chart illustrating the waveform of the second half of the band signal after the second half has been subjected to fade-in processing. By performing cross fade processing with respect to the fade-out processed signal (shown in portion (a) of FIG. 5) and the fade-in processed signal (shown in portion (b) of FIG. 5), a waveform shown in portion (c) of FIG. 5 is obtained.

Thereafter, the respective band signals which have been cross-fade processed in the above-described manner are band-synthesized by the synthesis filter bank 209, whereby a signal on a normal time axis is produced. By sequentially performing the above-described processing with respect to the respective band signals, each having a sample length Tf, a 2x high-speed reproducing operation can be performed.

On the other hand, in the case of performing cross fade processing in which the overlapping range is arbitrarily changed, instead of the above-described cross fade processing in which the first half and the second half of the band signal are totally overlapped, the reproduction speed is also varied in accordance with the change of the overlapping range. For example, in the case of performing cross fade processing such that the overlapping range corresponds to one-fourth of the sample length Tf, each cross-fade processed band signal has a sample length three-fourths as long as the sample length Tf so that the reproduction speed becomes four-thirds as high as a normal speed. That is to say, assuming that the time interval to be overlapped is Tc, the reproduction speed F can be represented as: $F=Tf/(Tf-Tc)$.

In other words, if the sample lengths Tf and Tc are set such that the reproduction speed F set by a user satisfies the relationship: $F-Tf/(Tf-Tc)$, the reproducing operation can be performed at a reproduction speed desired by the user. In such a case, the reproducing apparatus has a configuration shown in FIG. 6.

Figure 6:
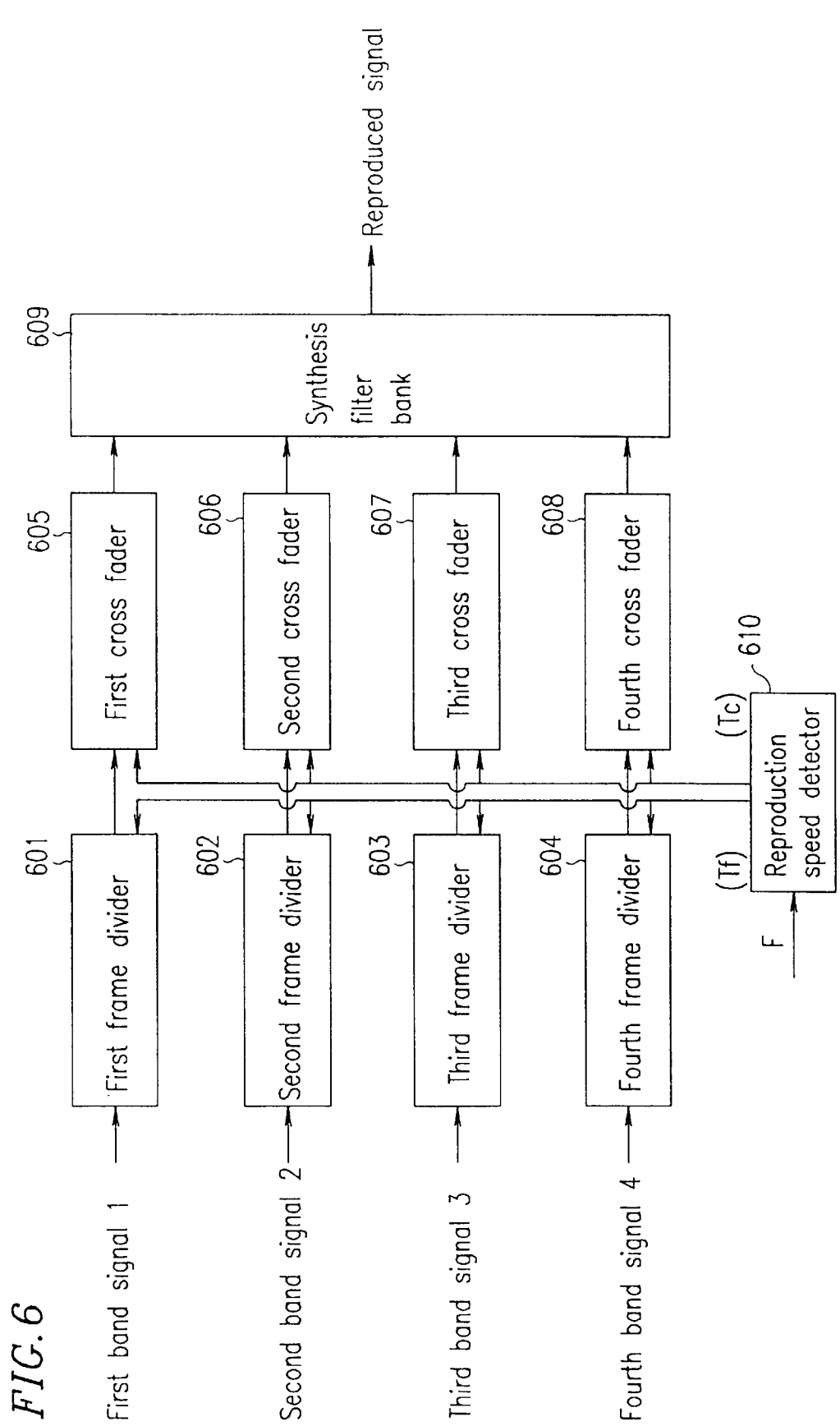
FIG. 6 is a block diagram showing another configuration for a reproducing apparatus in the first example of the present invention for performing a reproducing operation at a reproduction speed desired by a user.

More specifically, in FIG. 6, a reproduction speed detector 610 for detecting the reproduction speed F designated by the user is provided and Tf and Tc are set such that the reproduction speed F given by the user satisfies the relationship: $F=Tf/(Tf-Tc)$. In general, Tf is determined by the buffer length of the input section (i.e., in this example, the buffer length of each of the first to the fourth frame dividers 601 to 604). Thus, assuming that Tf is a constant, it is necessary to set Tc so as to satisfy the relationship: $Tc=Tf \times (F-1)/F$.

As described above, the reproducing apparatus in the first example of the present invention includes: a first to a fourth frame divider for frame-dividing and retaining one frame of the respective band signals such that the resulting frame has a predetermined sample length Tf; a first to a fourth cross fader for time-axis compressing the respective band signals at the same ratio; and a synthesis filter bank for band-synthesizing the time-axis compressed band signals. In the reproducing apparatus, the first to the fourth frame dividers frame-divide and retain the respective band signals such that the resulting frame has a predetermined sample length Tf; the first to the fourth cross faders perform cross-fade processing by overlapping the first half and the second half of the frame-divided signals corresponding to the respective bands by a predetermined sample length Tc, thereby time-axis compressing the respective band signals; and then the synthesis filter bank band-synthesizes the respective band signals which have been subjected to the time-axis compression processing. As a result, since the amount of operation processing to be performed by the synthesis filter bank can be reduced as compared with the case of compressing (or shortening) the length of the time axis after the band synthesis has been performed, the amount of the processing to be performed by the entire apparatus can also be reduced.

In addition, by utilizing the above-described configuration, since the amplitude level can be kept constant on the time axis of the waveform and the amount of information lost is small, a sound can be reproduced satisfactorily even in the case of a high-speed reproduction.

In this example, no limitation is applied to the respective band signals to be input for simplifying the description.

However, the effects of the present invention become particularly remarkable when the present invention is applied to a reproducing apparatus for reproducing an encoded signal which has been encoded by an encoding method in which an original signal is band-divided and then the respective band signals are encoded (e.g., MPEG1 audio encoding method). That is to say, according to the present invention, a band signal to be input is a band signal which has been extracted from a bit stream of MPEG1 audio encoded data and obtained by dequantizing encoded data corresponding to each frequency band, in the case of the MPEG1 audio encoding method, for example. In such a case, the synthesis filter bank is a synthesis filter bank for synthesizing 32 band signals and the amount of the operation processing to be performed by the filter bank becomes enormous. Thus, if the time-axis compression is performed before the band synthesis is performed in accordance with the present invention, the amount of the operation processing to be performed can be advantageously reduced considerably.

Hereinafter, the effects of the present invention will be described by comparing the amount of operation processing to be performed in the first example of the present invention with the amount of operation processing to be performed in accordance with the conventional technologies shown in FIG. 20. In the case where the reproducing apparatus shown in FIG. 20 performs a 2x high-speed reproducing operation, for example, a PCM signal corresponding to two unit time periods are required to be output from the synthesis filter bank 2005 for obtaining high-speed reproduction processed PCM signal corresponding to one unit time period. In other words, it is necessary to perform processing corresponding to two unit time periods before the signal processed by the synthesis filter bank 2005 is output. However, the amount of processing to be performed before the signal processed by the synthesis filter bank 2005 is output (the amount of operation processing performed by the synthesis filter bank 2005, in particular) becomes enormous. Thus, if the high-speed reproduction is performed in accordance with the conventional technologies, the amount of operation processing to be performed becomes disadvantageously enormous. If data corresponding to two unit time periods can be time-axis compressed (shortened) into data corresponding to one unit time period before the synthesis filter bank starts the processing (i.e., if the high-speed reproduction processing (for having the time axis) has been finished before the synthesis filter bank starts the processing), then the amount of processing to be performed by the synthesis filter bank can be one-half of the amount normally required, so that the amount of operation processing can be considerably reduced. A quantitative comparison will be performed below based on specific values.

Figure 20:
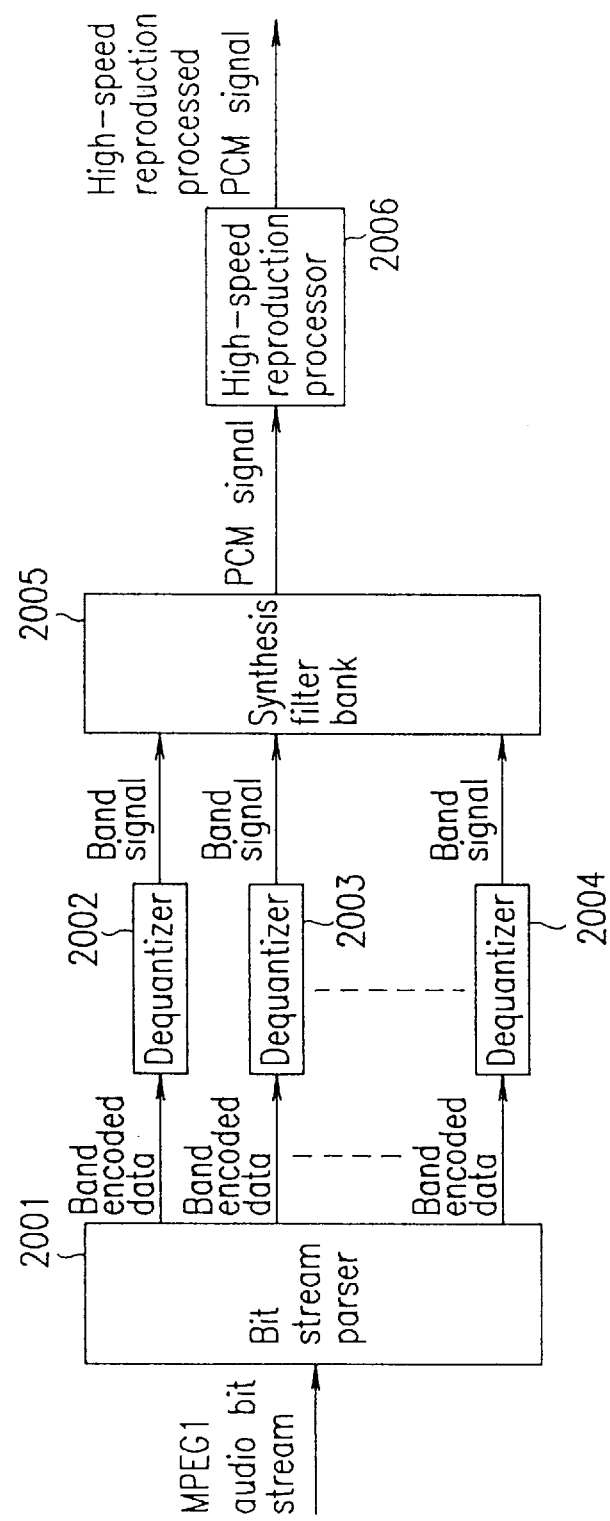
FIG. 20 is a block diagram showing a configuration for performing a high-speed reproduction of MPEG1 audio encoded data in accordance with conventional technologies.

In FIG. 20, the amounts of the operation processing to be performed by the bit stream parser 2001, the dequantizer 2002, the synthesis filter bank 2005 and the high-speed reproduction processor 2006 are assumed to be represented as 2, 1, 10 and 1, respectively. Assuming that the bit stream is divided into four channels, the amount of operation processing to be performed by the conventional reproducing apparatus shown in FIG. 20 becomes: 4×(2+1+10)+1=53. On the other hand, in FIG. 1, the amounts of the operation processing to be performed by the bit stream parser 101, the dequantizer 102, the time-scale modifier 105 and the synthesis filter bank 108 are assumed to be represented as 2, 1, 1 and 10, respectively. Assuming that the bit stream is divided into four channels, the amount of operation processing to be performed by the reproducing apparatus according to the present invention shown in FIG. 1 becomes: 4×(2+1+1)+10=26. Thus, the amount of operation processing to be performed by the reproducing apparatus according to the present invention becomes smaller than one-half of the amount of operation processing to be performed by the conventional reproducing apparatus. Consequently, if the reproducing apparatus according to the present invention is integrated, the size of the resulting chip can be halved, so that the amount of current to be consumed by the chip can be advantageously reduced considerably.

EXAMPLE 2

Hereinafter, a reproducing apparatus in a second example of the present invention will be described with reference to the drawings. The second example relates to a high-speed reproducing apparatus utilizing decimation processing of repeating waveforms.

Figure 7:
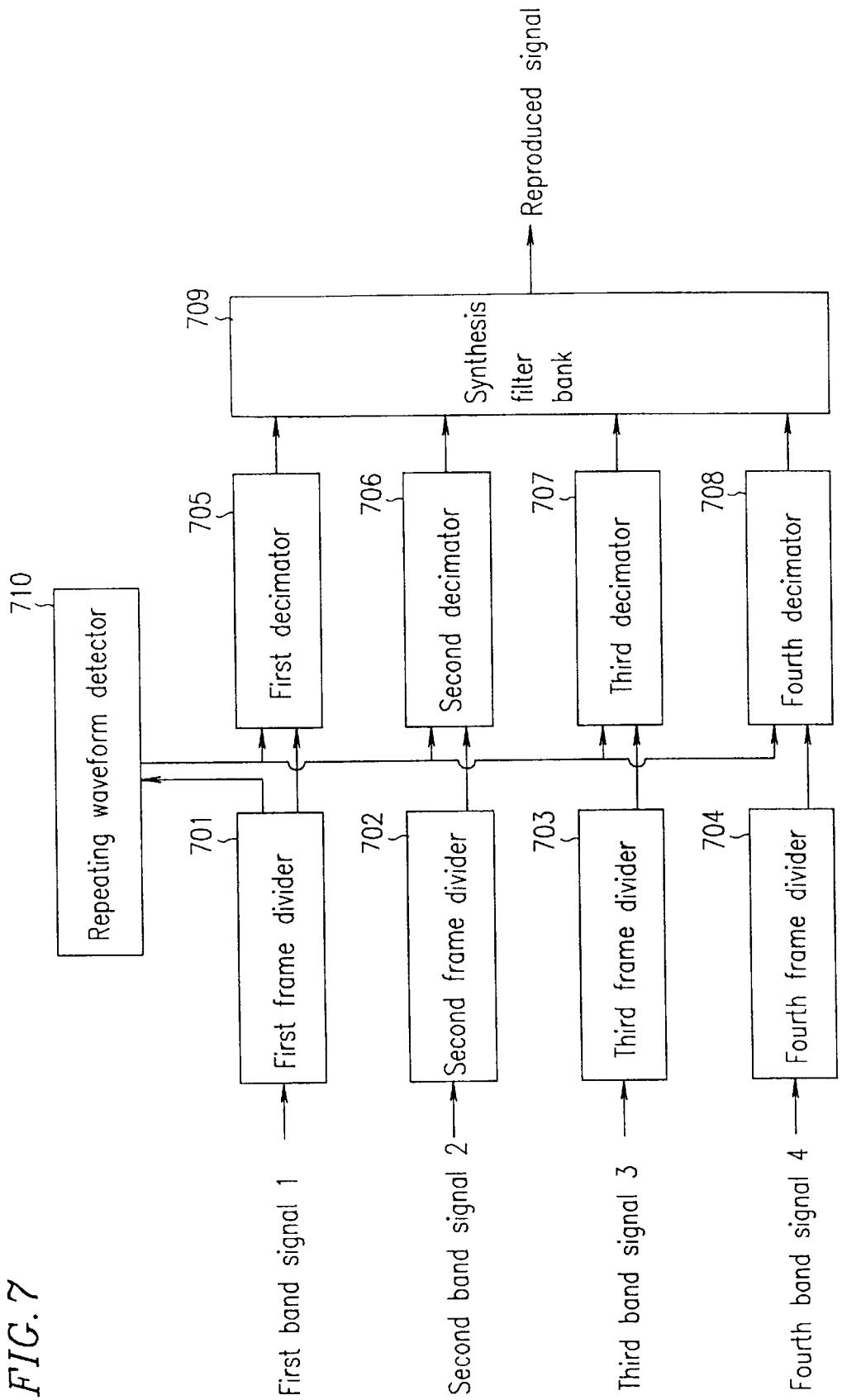
FIG. 7 is a block diagram showing a configuration for a reproducing apparatus in a second example of the present invention.

FIG. 7 is a block diagram showing a configuration for the reproducing apparatus in the second example of the present invention. In FIG. 7, the reference numeral 701 denotes a first frame divider for dividing a first input band signal into a plurality of frames and retaining one frame thereof having a sample length Tf; 702 denotes a second frame divider for dividing a second input band signal into a plurality of frames and retaining one frame thereof having a sample length Tf; 703 denotes a third frame divider for dividing a third input band signal into a plurality of frames and retaining one frame thereof having a sample length Tf; and 704 denotes a fourth frame divider for dividing a fourth input band signal into a plurality of frames and retaining one frame thereof having a sample length Tf.

In FIG. 7, it is assumed that the first to the fourth band signals to be input are band signals obtained by dividing a signal on a normal time axis into four band signals corresponding to the respective bands by a filter bank which performs a ¼ down sampling (i.e., a sampling for retaining one-fourth of the original samples and discarding or decimating the remaining samples) and that the first band signal is a band signal in the lowest band and the fourth band signal is a band signal in the highest band. In this example, an original signal is assumed to be divided into four band signals, for simplification. However, the number of band signals obtained by the band division is preferably several tens in the primary applications of the present invention. For example, the number of band signals is preferably 32 and each band-divided signal is preferably 1/32 down-sampled, as defined by the MPEG1 audio encoding method (see, for example, ISO/IEC 11172-3:1993).

The reference numeral 710 denotes a repeating waveform detector which extracts a repeating waveform from a band signal corresponding to a band in which pitch components of a sound are included and detects a time Ts corresponding to a start point and a time Te corresponding to an end point of the repeating waveform; 705 denotes a first decimator for deleting the signal section between the times Ts and Te from the first band signal which has been frame-divided and retained by the first frame divider 701, thereby time-axis compressing the first band signal; 706 denotes a second decimator for deleting the signal section between the times Ts and Te from the second band signal which has been frame-divided and retained by the second frame divider 702, thereby time axis compressing the second band signal; 707 denotes a third decimator for deleting the signal section between the times Ts and Te from the third band signal which has been frame-divided and retained by the third frame divider 703, thereby time-axis compressing the third band signal; 708 denotes a fourth decimator for deleting the signal section between the times Ts and Te from the fourth band signal which has been frame-divided and retained by the fourth frame divider 704, thereby time-axis compressing the fourth band signal; and 709 denotes a synthesis filter bank for band-synthesizing the band signals which correspond to the four bands and have been subjected to the decimation processing.

Figure 8:
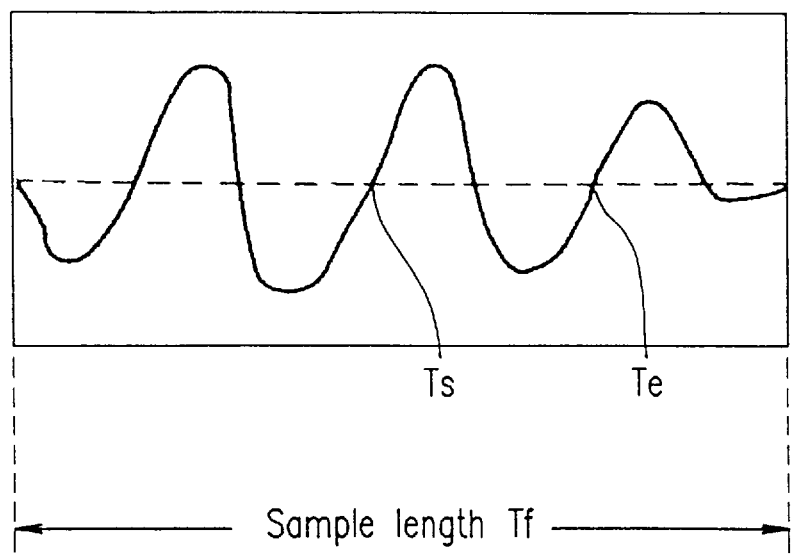
FIG. 8 is a waveform chart illustrating how the time Ts corresponding to a start point and the time Te corresponding to an end point of a repeating waveform are detected.
Figure 9:
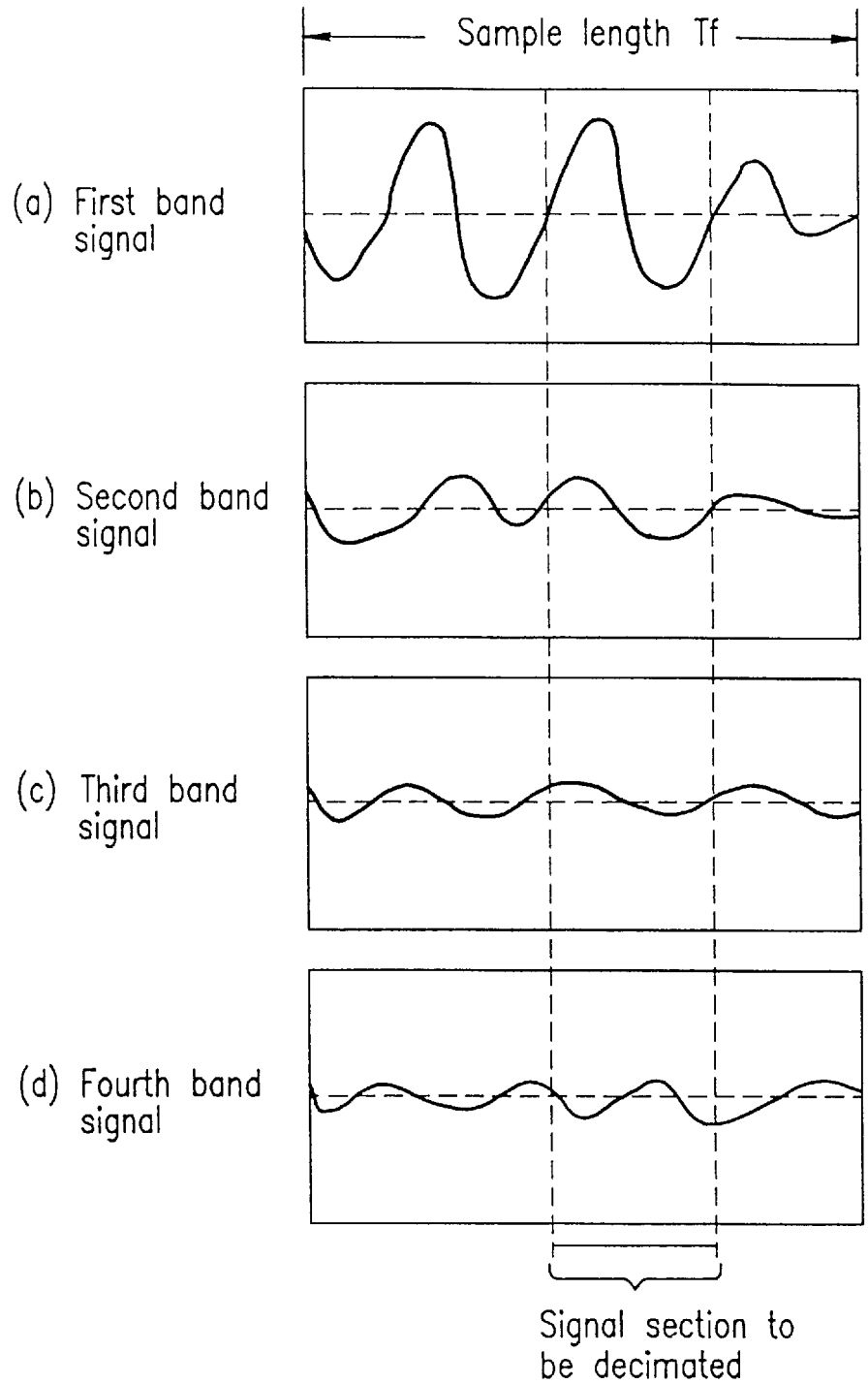
FIG. 9 is a waveform chart illustrating how the decimation processing is performed with respect to the first to the fourth band signals corresponding to portions (a) to (d), respectively.

FIG. 8 is a waveform chart illustrating how the time Ts corresponding to a start point and the time Te corresponding to an end point of a repeating waveform are detected. FIG. 9 is a waveform chart illustrating how the decimation processing is performed with respect to the first to the fourth band signals corresponding to portions (a) to (d), respectively.

Hereinafter, the operation of the reproducing apparatus having the above-described configuration will be described with reference to FIGS. 7, 8 and 9.

First, as shown in FIG. 7, the input first band signal is divided into a plurality of frames and one frame thereof having a sample length Tf is retained by the first frame divider 701; the input second band signal is divided into a plurality of frames and one frame thereof having a sample length Tf is retained by the second frame divider 702; the input third band signal is divided into a plurality of frames and one frame thereof having a sample length Tf is retained by the third frame divider 703; and the input fourth band signal is divided into a plurality of frames and one frame thereof having a sample length Tf is retained by the fourth frame divider 704.

Next, the repeating waveform detector 710 extracts a repeating waveform from a band signal corresponding to a band in which pitch components of a sound are included and detects a time Ts corresponding to a start point and a time Tc corresponding to an end point of the repeating waveform. Since the pitch components of a sound have a frequency of about 500 Hz or less, it is only necessary to extract a repeating waveform from a band signal in such a frequency band and detect a time Ts corresponding to a start point and a time Te corresponding to an end point of the repeating waveform. In this example, the first band signal is assumed to correspond to such a band signal. Thus, the time Ts corresponding to a start point and the time Te corresponding to an end point of the repeating waveform are detected from the first band signal which has been frame-divided and retained by the first frame divider 701. The repeating waveform may be extracted by a widely used method. For example, as disclosed in Japanese Laid-Open Patent Publication No. 61-202531, the repeating waveform can be easily detected by a method in which an autocorrelation function of the waveform to be analyzed is obtained and then the location of the repeating waveform is detected based on the shift width of the autocorrelation when the local maximum value of the autocorrelation function exceeds a predetermined threshold value. The time Ts corresponding to a start point and the time Tc corresponding to an end point of the repeating waveform are detected from the first band signal which has been frame-divided and retained by the first frame divider 701 in this way. FIG. 8 illustrates an exemplary waveform used for such a detection.

Next, the first decimator 705 deletes the signal section between the times Ts and Te from the first band signal which has been frame divided and retained by the first frame divider 701, thereby time-axis compressing the first band signal; the second decimator 706 deletes the signal section between the times Ts and Te from the second band signal which has been frame-divided and retained by the second frame divider 702, thereby time-axis compressing the second band signal; the third decimator 707 deletes the signal section between the times Ts and Te from the third band signal which has been frame-divided and retained by the third frame divider 703, thereby time-axis compressing the third band signal; and the fourth decimator 708 deletes the signal section between the times Tc and Te from the fourth band signal which has been frame-divided and retained by the fourth frame divider 704, thereby time-axis compressing the fourth band signal. FIG. 9 is a waveform chart illustrating how the decimation processing is performed with respect to the respective band signals. It is the signal sections shown in FIG. 9 that are to be decimated.

Thereafter, the synthesis filter bank 709 band-synthesizes the respective band signals which have been subjected to the decimation processing in the above-described manner, thereby producing a signal on a normal time axis. By sequentially performing the above-described processing with respect to the respective band signals, each having a sample length Tf, a high-speed reproducing operation can be performed.

As described above, the reproducing apparatus in the second example of the present invention includes: a first to a fourth frame divider for frame-dividing and retaining the respective band signals such that the resulting frame has a predetermined sample length Tf; a repeating waveform detector which extracts a repeating waveform from a band signal corresponding to a band in which pitch components of a sound are included and detects the time Ts corresponding to a start point and a time Te corresponding to an end point of the repeating waveform; a first to a fourth decimator for decimating the signal section between the times Tc and Te from each band signal; and a synthesis filter bank for band-synthesizing the band signals which have been subjected to the decimation processing. In the reproducing apparatus, the first to the fourth frame dividers frame-divide and retain the respective band signals such that the resulting frame has a predetermined sample length Tf; the repeating waveform detector extracts a repeating waveform from a band signal corresponding to a band in which pitch components of a sound are included; the first to the fourth decimators decimate the signal section between the times Ts and Te from each band signal; and then the synthesis filter bank band-synthesizes the respective band signals which have been subjected to the decimation processing. As a result, since the amount of operation processing to be performed by the synthesis filter bank can be reduced as compared with the case of compressing (or shortening) the length of the time axis after the band synthesis is performed, the amount of the processing to be performed by the entire apparatus can also be reduced. In addition, since the time axis can be compressed without causing any discontinuous point on the time axis of the waveform, a satisfactory sound can be reproduced even when a high-speed reproducing operation is performed.

In this example, no limitation is applied to the respective band signals to be input for simplifying the description. However, the effects of the present invention become particularly remarkable when the present invention is applied to a reproducing apparatus for reproducing an encoded signal which has been encoded by an encoding method in which an original signal is band-divided and then the respective band signals are encoded (e.g., MPEG1 audio encoding method). That is to say, according to the present invention, a band signal to be input is a band signal which has been extracted from a bit stream of MPEG1 audio encoded data and obtained by dequantizing the encoded data corresponding to each frequency band, in the case of the MPEG1 audio encoding method, for example. In such a case, the synthesis filter bank is a synthesis filter bank for synthesizing 32 band signals and the amount of the operation processing to be performed by the filter bank becomes enormous. Thus, if the time axis compression is performed before the band synthesis is performed in accordance with the present invention, the amount of the operation processing to be performed can be advantageously reduced considerably.

EXAMPLE 3

Hereinafter, a reproducing apparatus in a third example of the present invention will be described with reference to the drawings.

Figure 10:
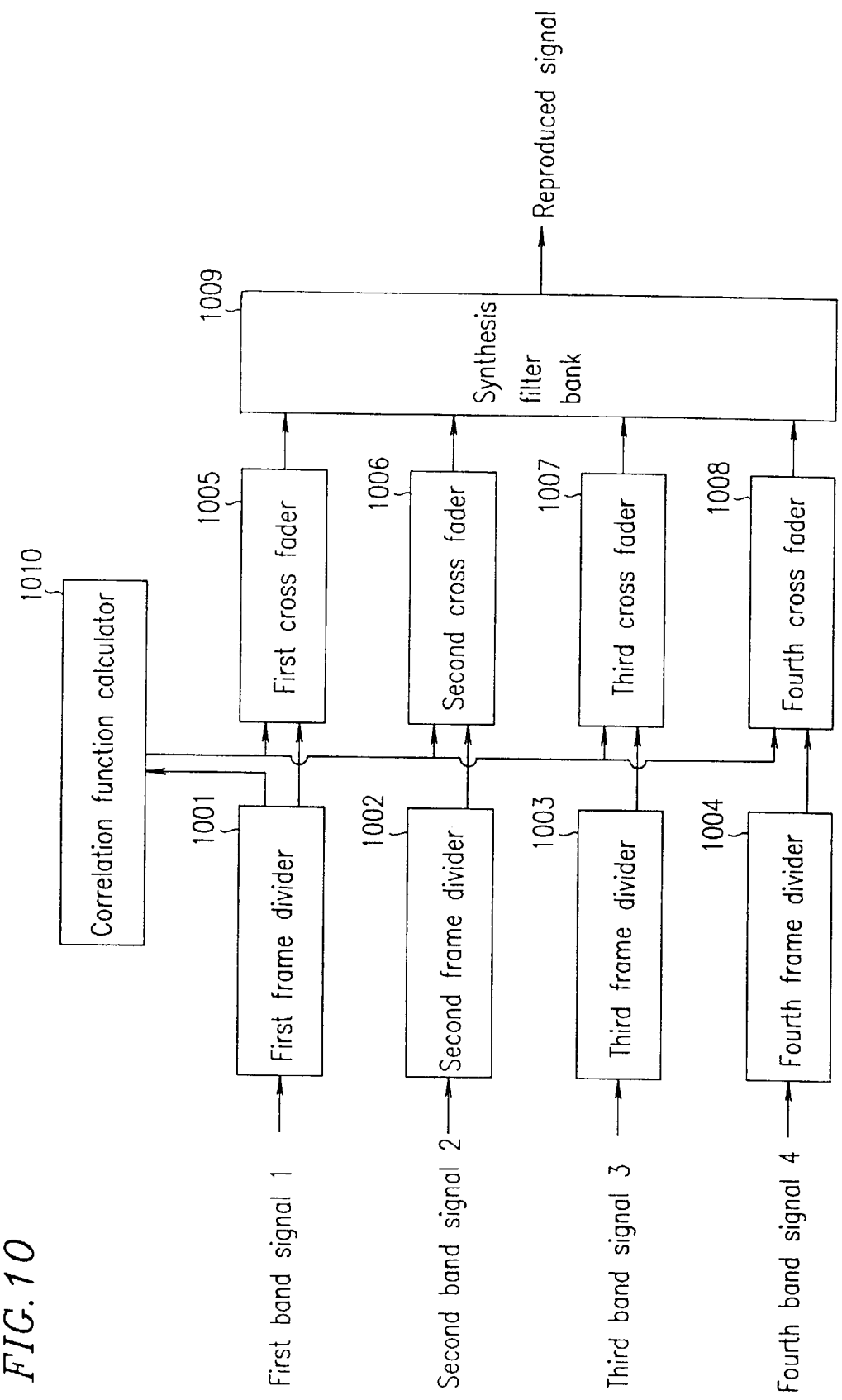
FIG. 10 is a block diagram showing a configuration for a reproducing apparatus in a third example of the present invention.

FIG. 10 is a block diagram showing a configuration for the reproducing apparatus in the third example of the present invention. In FIG. 10, the reference numeral 1001 denotes a first frame divider for dividing a first input band signal into a plurality of frames and retaining one frame thereof having a sample length Tf; 1002 denotes a second frame divider for dividing a second input band signal into a plurality of frames and retaining one frame thereof having a sample length Tf; 1003 denotes a third frame divider for dividing a third input band signal into a plurality of frames and retaining one frame thereof having a sample length Tf; and 1004 denotes a fourth frame divider for dividing a fourth input band signal into a plurality of frames and retaining one frame thereof having a sample length Tf.

In FIG. 10, it is assumed that the first to the fourth band signals to be input are band signals obtained by dividing a signal on a normal time axis into four band signals corresponding to the receptive bands by a filter bank which performs a ¼ down sampling (i.e., a sampling for retaining one-fourth of the original samples and discarding or decimating the remaining samples) and that the first band signal is a band signal in the lowest band and the fourth band signal is a band signal in the highest hand. In this example, an original signal is assumed to be divided into four band signals for simplication. However, the number of band signals obtained by the band division is preferably several tens in the primary applications of the present invention. For example, the number of band signals is preferably 32 and each band-divided signal is preferably 1/32 down-sampled, as defined by the MPEG1 audio encoding method (see, for example, ISO/IEC 11172-3: 1993).

The reference number 1010 denotes a correlation function calculator for calculating a correlation value S(n) obtained when the first half and the second half of a band signal corresponding to a band, in which the pitch components of a sound are included, are overlappped in an overlapping range defined by n samples and detecting as Tc a specific value of n corresponding to the maximum value of S(n); 1005 denotes a first cross fader for performing cross fade processing with respect to the first half and the second half of the first band signal, which has been frame-divided and retained by the first frame divider 1001, by overlapping the first half and the second half by the sample length Tc; 1006 denotes a second cross fader for performing cross fade processing with respect to the first half and the second half of the second band signal, which as been frame-divided and retained by the second frame divider 1002, by overlapping the first half and the second half by the sample length Tc; 1007 denotes a third cross fader for performing cross fade processing with respect to the first half and the second half of the third band signal, which has been frame-divided and retained by the third frame divider 1003, by overlapping the first half and the second half by the sample length Tc; 1008 denotes a fourth cross fader for performing cross fade processing with respect to the first half and the second half of the fourth band signal, which has been frame-divided and retained by the fourth frame divider 1004, by overlapping the first half and the second half by the sample length Tc; and 1009 denotes a synthesis filter bank for band-synthesizing the cross-fade processed band signals corresponding to four bands.

Figure 11:
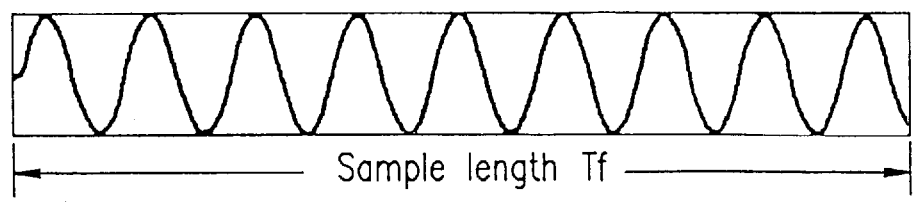
FIG. 11 is a waveform chart illustrating the waveform of a frame signal in a frequency band in which pitch components of a sound are included.
Figure 12:
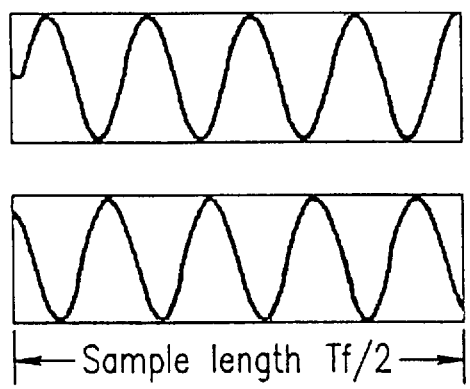
FIG. 12 is a waveform chart illustrating how the frame signal in a frequency band i which pitch components of a sound are included is divided into a first half and a second half.
Figure 13:
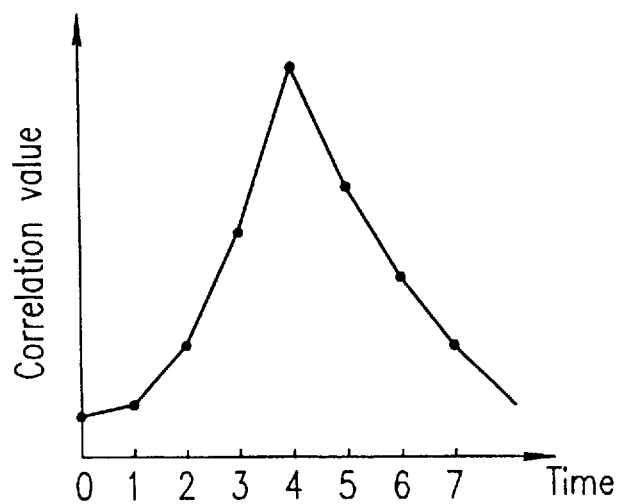
FIG. 13 is a graph showing a correlation function between the first half and the second half of the frame signal in a frequency band in which pitch components of a sound are included.
Figure 14:
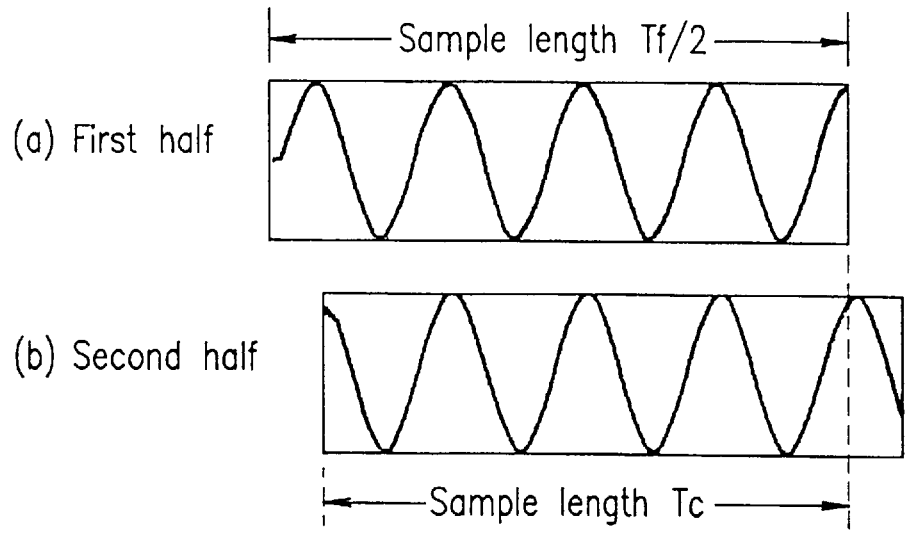
FIG. 14 is a waveform chart for qualitatively illustrating the time when the correlation function becomes maximum in which the first half and the second half of the frame signal correspond to portions (a) and (b), respectively.
Figure 15:
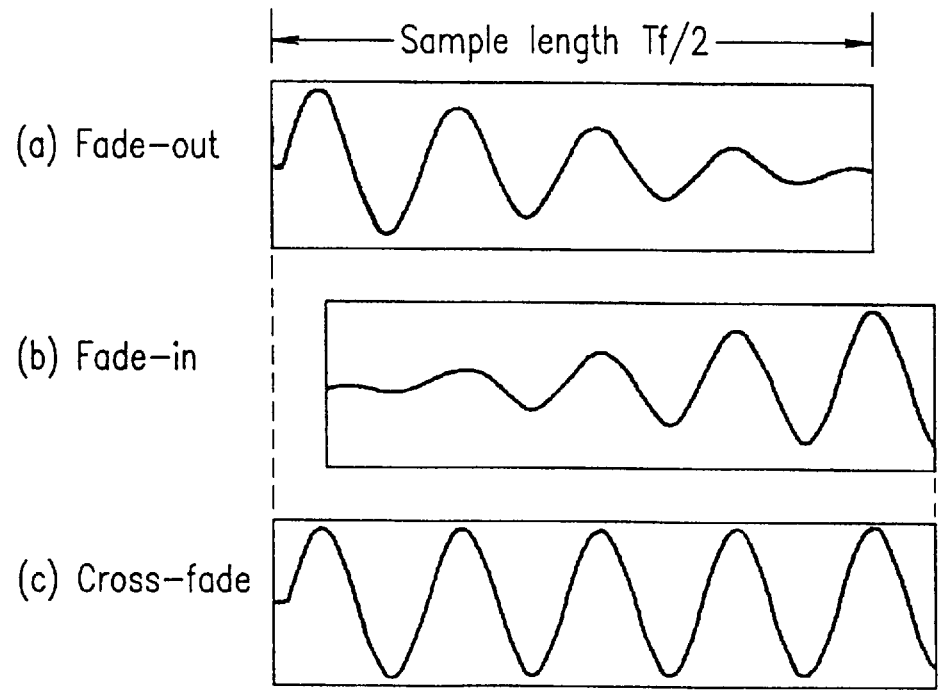
FIG. 15 is a waveform chart showing how the cross fade processing is performed by overlapping the first half and the second half of the frame signal by the sample length Tc, in which portions (a), (b) and (c) correspond to the fade-out processed first half of the frame signal, the fade-in processed first half of the frame signal and a signal obtained by subjecting the first half and the second half to cross fade processing, respectively.

FIG. 11 is a waveform chart illustrating the waveform of a frame signal in a frequency band in which pitch components of a second are included; FIG. 12 is a waveform chart illustrating how the frame signal in a frequency band in which pitch components of a sound are included is divided into a first half and a second half; FIG. 13 is a graph showing a correlation function between the first half and the second half of the frame signal in a frequency band in which pitch components of a sound are included; FIG. 14 is a waveform chart for qualitatively illustrating the time when the correlation function becomes maximum, in which the first half and the second half of the frame signal correspond to portions (a) and (b), respectively; and FIG. 15 is a waveform chart showing how the cross fade processing is performed by overlapping the first half and the second half of the frame signal by the sample length Tc, in which portions (a), (b) and (c) correspond to the fade-out processed first half of the frame signal, the fade-in processed second half of the frame signal and a signal obtained by subjecting the first half and the second half to cross fade processing, respectively.

Hereinafter, the operation of the reproducing apparatus having the above-described configuration will be described with reference to FIGS. 10 to 15.

First, as shown in FIG. 10, the input first band signal is divided into a plurality of frames and one frame thereof having a sample length Tf is retained by the first frame divider 1001; the input second band signal is divided into a plurality of frames and one frame thereof having a sample length Tf is retained by the second frame divider 1002; the input third band signal is divided into a plurality of frames and one frame thereof having a sample length Tf is retained by the third frame divider 1003; and the input fourth band signal is divided into a plurality of frames and one frame thereof having a sample length Tf is retained by the fourth frame divider 1004.

Next, the correlation function calculator 1010 calculates a correlation value between the first half and the second half of a frame signal of a band signal corresponding to a frequency band, in which pitch components of a sound are included, and obtains a time when the correlation function becomes maximum. A frequency band in which pitch components of a sound are included is a frequency band including frequencies ranging from several tens of Hz to about 500 Hz. In the MPEG1 audio encoding method, for example, the frequency band corresponds to the lowest frequency band. In this example, it is assumed that the first band signal corresponds to the frequency band.

FIG. 11 shows an exemplary waveform of a frame signal in a frequency band in which pitch components of a sound are included, while FIG. 12 shows the frame signal divided into a first half and a second half. The first half of the frame signal is shown in the upper side, while the second half of the frame signal is shown on the lower side. FIG. 13 is a graph showing a correlation function between the first half and the second half of the frame signal shown in FIG. 12. As shown in FIG. 13, the time when the correlation value becomes maximum is "4" in this example. In FIG. 13, the "time" on the axis of the abscisses is represented by a sampling period as a unit. For example, in the case where a sampling period is 20.83 μs (i.e., in the case where a sampling frequency is 48 kHz), the time interval between a time "0" and a time "7" shown in FIG. 13 is: 20.83 μs×7=145.83 μs. FIG. 14 qualitiatively illustrates a time when the correlation function between the first half and the second half of the frame signal becomes maximum. That is to say, the time when the correlation function between the first half and the second half of the frame signal becomes maximum is a time to be shifted for matching the phases of the first half and the second half of the frame signal while the first half and the second half of the frame signal are being overlapped by shifting the second half with respect to the first half little by little. In such a case, the overlap width between the first half and the second half of the frame signal is assumed to be equal to the sample length Tc. In this example. Tc=Tf/2−4.

Next, the first cross fader 1005 performs cross fade processing with respect to the first half and the second half of the first band signal, which has been frame-divided and retained by the first frame divider 1001, by overlapping the first half and the second half by the sample length Tc; the second cross fader 1006 performs cross fade processing with respect to the first half and the second half of the second band signal, which has been frame-divided and retained by the second frame divider 1002, by overlapping the first half and the second half by the sample length Tc; the third cross fader 1007 performs cross fade processing with respect to the first half and the second half of the third band signal which has been frame-divided and retained by the third frame divider 1003, by overlapping the first half and the second half by the sample length Tc; and the fourth cross fader 1008 performs cross fade processing with respect to the first half and the second half of the fourth band signal, which has been frame-divided and retained by the fourth frame divider 1004, by overlapping the first half and the second half by the sample length Tc. FIG. 15 shows an example of such cross fade processing. Portion (a) shows a signal obtained by subjecting the first half of the band signal to fade-out processing, while portion (b) shows a signal obtained by subjecting the sound half of the band signal to fade-in processing such that the second half is shifted with respect to the first half by a predetermined sample length. By cross-face processing the fade-out processed signal (a) and the fade-in processed signal (b), a waveforms such as that shown in portion (c) of FIG. 15 can be obtained. Portion (c) shows how the first cross fader 1005 performs cross fade processing with respect to the first half and the second half of the band signal, which has been frame-divided and retained by the first frame divider 1001, by overlapping the first half and the second half by the sample length Tc.

Thereafter, the respective band signals which have been cross-face processed in the above-described manner are band-synthesized by the synthesis filter bank 1009, whereby a signal on a normal time axis is produced. My sequentially performing the above-described processing with respect to the respective band signals, each having a sample length Tf, a high-speed reproducing operation can be performed.

As described above, the reproducing apparatus in the third example of the present invention includes: a first to a fourth frame divider for frame-dividing and retaining the respective band signals such that the resulting frame has a predetermined sample length Tf; a correlation function calculator for calculating a correlation value S(n) obtained when the first half and the second half of a band signal corresponding to a band, in which pitch components of a sound are included, are overlapped in an overlap range defined by n samples and detecting as Tc a specific value of n corresponding to the maximum value of S(n); a first to a fourth cross fader which perform cross fade processing with respect to the first half and the second half of each band signal by overlapping the first half and the second half by a sample length Tc; and a synthesis filter bank for band-synthesizing the band signals which have been subjected to the cross-fade processing. In the reproducing apparatus, the first to the fourth frame dividers frame-divide and retain the respective band signals such that the resulting frame has a predetermined sample length Tf; the correlation function calculator calculates a correlation value S(n) obtained when the first half and the second half of a band signal corresponding to a band, in which pitch components of a sound are included, are overlapped in an overlap range defined by n samples and detects as Tc a specific value of n corresponding to the maximum value of S(n); the first to the fourth cross faders perform cross fade processing with respect to the first half and the second half of each band signal by overlapping the first half and the second half by a sample length Tc; and then the synthesis filter bank band-synthesizes the band signals which have been subjected to the cross-fade processing. As a result, since the amount of operation processing to be performed by the synthesis filter bank can be reduced as compared with the case of compressing (or shortening) the length of the time axis after the band synthesis is performed, the amount of the processing to be performed by the entire apparatus can also be reduced. In addition, since the cross fade processing is performed in a state where the phases of the pitch frequency are in-phase, i.e., such that the peaks and troughs of the two waveforms to be cross-fade processed are respectively aligned with each other, a satisfactory sound can be reproduced.

In this case, if a reproducing apparatus having only the above-described components is used, then the reproduction speed is varied depending upon the input signal. Thus, by further providing a reproduction speed detector for detecting a reproduction speed F designated by a user, and a correlation function detecting range controller for controlling a range from which a correlation value is obtained, to be defined by m samples around Tb (=(Tb±m) samples), satisfying a relationship: F=Tf/(Tf−Tb) in accordance with the reproduction speed F, a high-speed reproducing operation can be performed at a reproduction speed desired by the user. In such a case, the reproducing apparatus has a configuration shown in FIG. 16.

Figure 16:
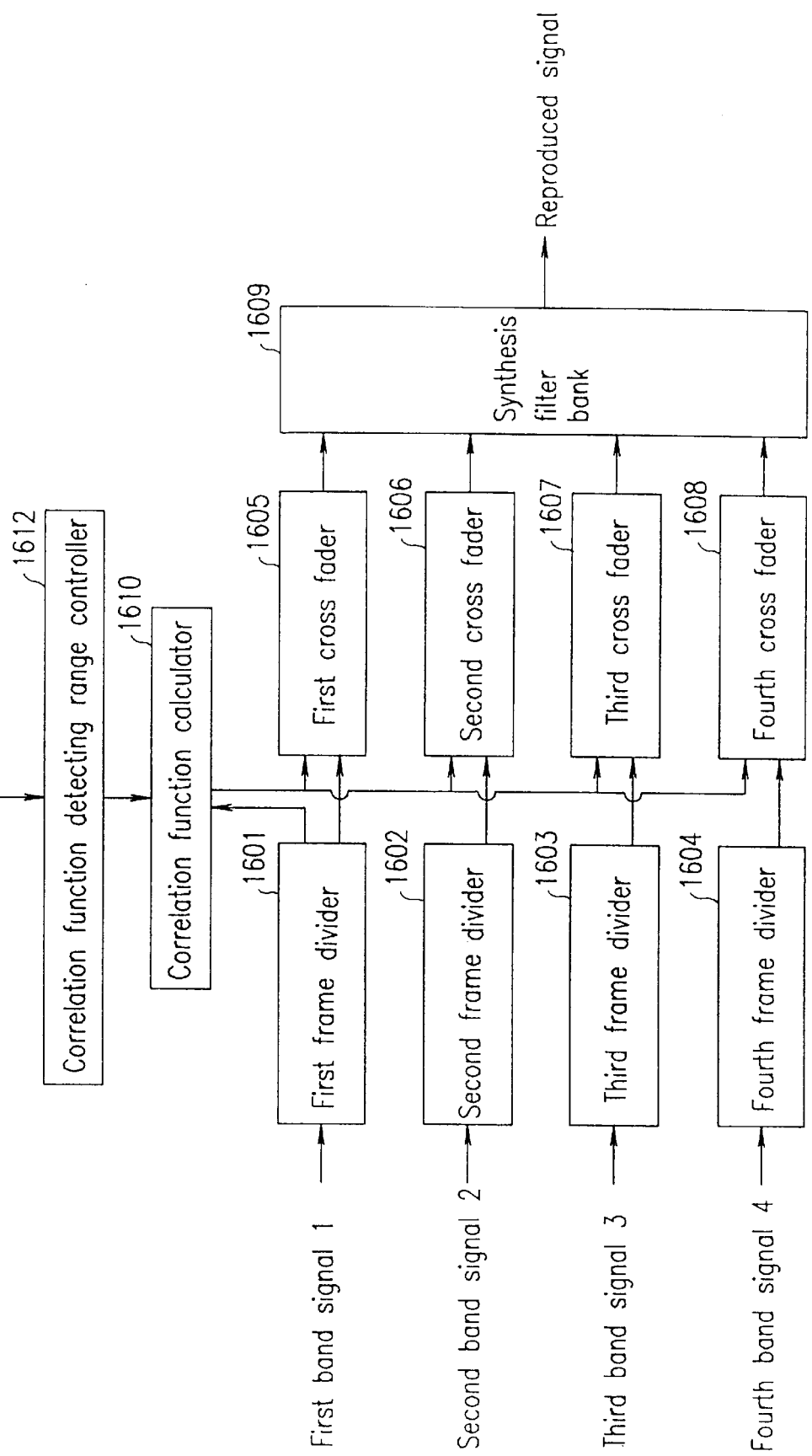
FIG. 16 is a block diagram showing another configuration for a reproducing apparatus in the third example of the present invention for performing a reproducing operation at a reproduction speed desired by a user.

More specifically, in FIG. 16, a reproduction speed detector 1611 for detecting the reproduction speed F designated by the user is provided and Tf and Tb are set such that the reproduction speed F given by the user satisfies the relationship: F=Tf/(Tf−Tb). In general, Tf is determined by the buffer length of the input section (i.e., in this example, the buffer length of each of the first to the fourth frame dividers 1601 to 1604). Thus, assuming that Tf is a constant, it is necessary to set Tb so as to satisfy the relationship: Tf=Tf×(F−1)/F. The correlation function S(n) is calculated from the range defined by m samples around Tb (=(Tb±m) samples) thus obtained, and a value of n corresponding to the maximum value of S(n) is set to be Tc. In this case, m is required to be a value including one cycle of sound. For example, in the case of the MPEG1 audio, m is preferably 4 or n corresponding to the maximum value is preferably searched for in range defined by Tb±4 samples. Then, a sound can be reproduced substantially precisely at the reproduction speed desired by the user.

In the reproducing apparatus of the third example for reproducing an encoded signal which as been encoded by an encoding apparatus in which an original signal is band-divided and then the respective band signals are encoded, the amplitude level can be kept constant on the time axis of the waveform and the amount of information to be lost is small, a sound can be reproduced satisfactorily even in the case of a high-speed reproduction. In addition, since the cross-fade processing is performed in a state where the phases of the pitch frequency are in-phase, i.e., such that the peaks and troughs of the two waveforms to be cross-fade processed are respectively aligned with each other, a more satisfactory sound can be reproduced. Furthermore, a high-speed reproducing operation can be performed in accordance with an arbitrary reproduction speed desired by the user.

However, though the reproducing apparatus having only the above-described components can reproduce a sound substantially precisely at the reproduction speed desired by the user, the reproduction speed is adversely varied to a certain degree depending upon the input signal. Thus, by providing a speed fine control value B for the correlation function detecting range controller 1612, the correlation function detecting range is sequentially controlled on a frame basis in accordance with the following rule.

More specifically, the initial value of the speed fine control value B is assumed to be "0" and the correlation function detecting range of the current frame is assumed to be defined by m samples around Tb±B (=(Tb+B±m) samples). After the correlation function S(n) is calculated from this range and a value of n corresponding to the maximum value of S(n) is obtained as Tc, R is updated such that B–B+(Tb–Tc). The correlation function detecting range of the next frame is assumed to be defined by m samples around Tb±B (–(Tb+B±m) samples) with respect to B thus updated. In this way, while sequentially updating the speed fine control value B on a frame basis, the correlation function detecting range is moved to an appropriate location. Then, a sound can be reproduced precisely at a reproduction speed desired by a user. The reason is as follows. By performing such a control, in the case where the overlapping range to be subjected to the cross fade processing tends to be small, the range from which the correlation function S(n) is detected is adjusted to move to a deeper location so that the overlapping range to be subjected to the cross fade processing becomes as large as possible. On the other hand, in the case where the overlapping range to be subjected to the cross fade processing tends to be large, the range from which the correlation function S(n) is detected as adjusted to move to a shallower location so that the overlapping range to be subjected to the cross fade processing becomes as small as possible.

Figure 17:
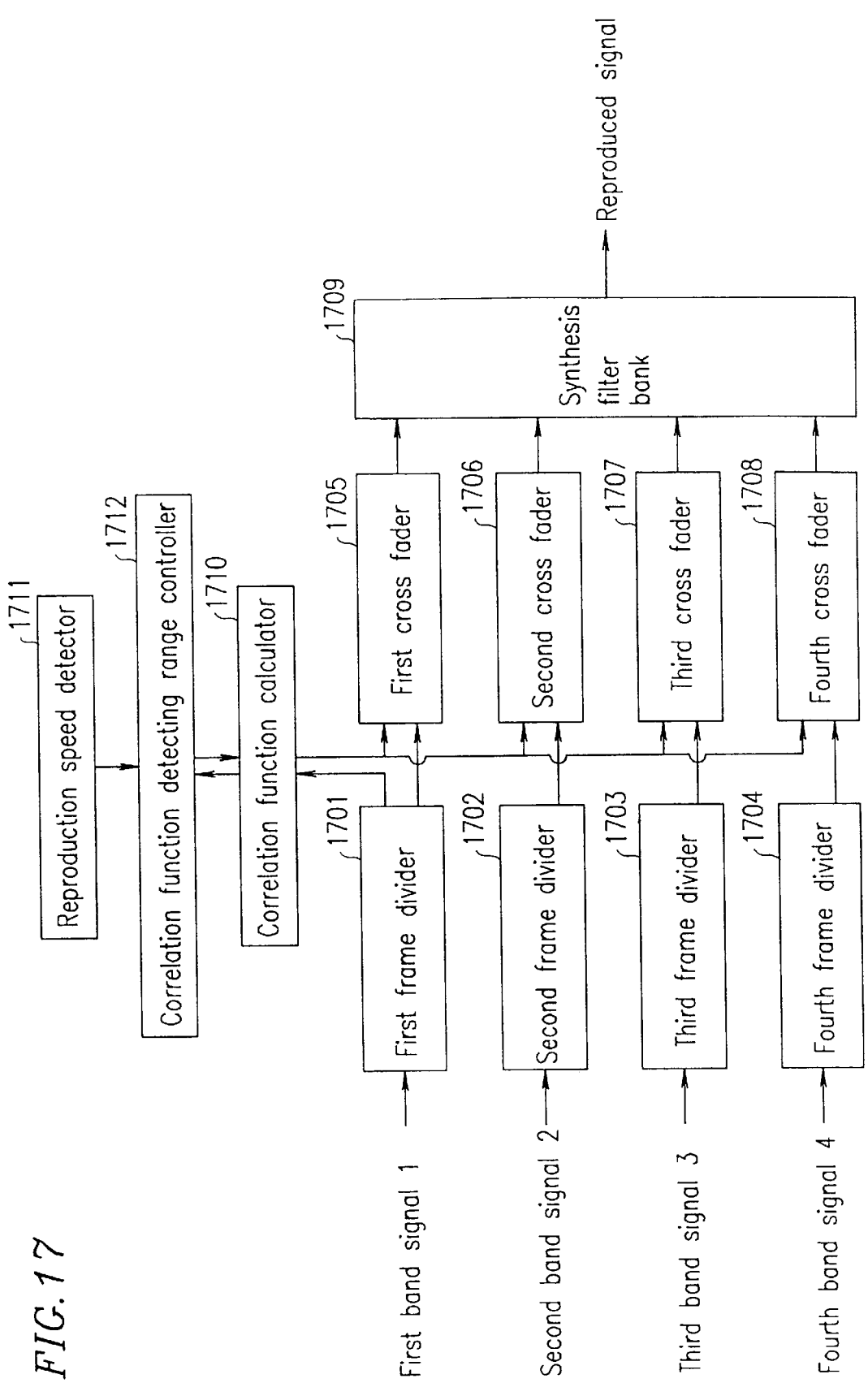
FIG. 17 is a block diagram showing still another configuration for a reproducing apparatus in the third example of the present invention for precisely performing a reproducing operation at a reproduction speed desired by a user.

In such a case, the reproducing apparatus has a configuration shown in FIG. 17. FIG. 17 is different from FIG. 16 in that an arrow extending from the correlation function calculator 1710 toward the correlation function detecting range controller 1712 is additionally drawn in FIG. 17, but the other configuration is totally the same in both cases. This arrow is drawn because the value Tc detected by the correlation function calculator 1710 is required to be transmitted to the correlation function detecting range controller 1712 on a frame basis such that the correlation function detecting range controller 1712 can perform a fine control of the correlation function detecting range.

In this example, no limitation is applied to the respective band signals to be input, for simplifying the description. However, the effects of the present invention becomes particularly remarkable when the present invention is applied to a reproducing apparatus for reproducing an encoded signal which has been encoded by an encoding method in which an original signal is band-divided and then the respective band signals are encoded (e.g., MPEG1 audio encoding method). That is to say, according to the present invention, a band signal to be input is a band signal which has been extracted from a bit stream of MPEG1 audio encoded data and obtained by dequantizing the encoded data corresponding to each frequency band, in the case of the MPEG1 audio encoding method, for example. In such a case, the synthesis filter bank is a synthesis filter bank for synthesizing 32 band signals and the amount of the operation processing to be performed by the filter bank becomes enormous. Thus, if the time axis compression is performed before the band synthesis is performed in accordance with the present invention, the amount of the operation processing to be performed can be advantageously reduced considerably.

EXAMPLE 4

Hereinafter, a reproducing apparatus in a fourth example of the present invention will be described with reference to the drawings.

Figure 18:
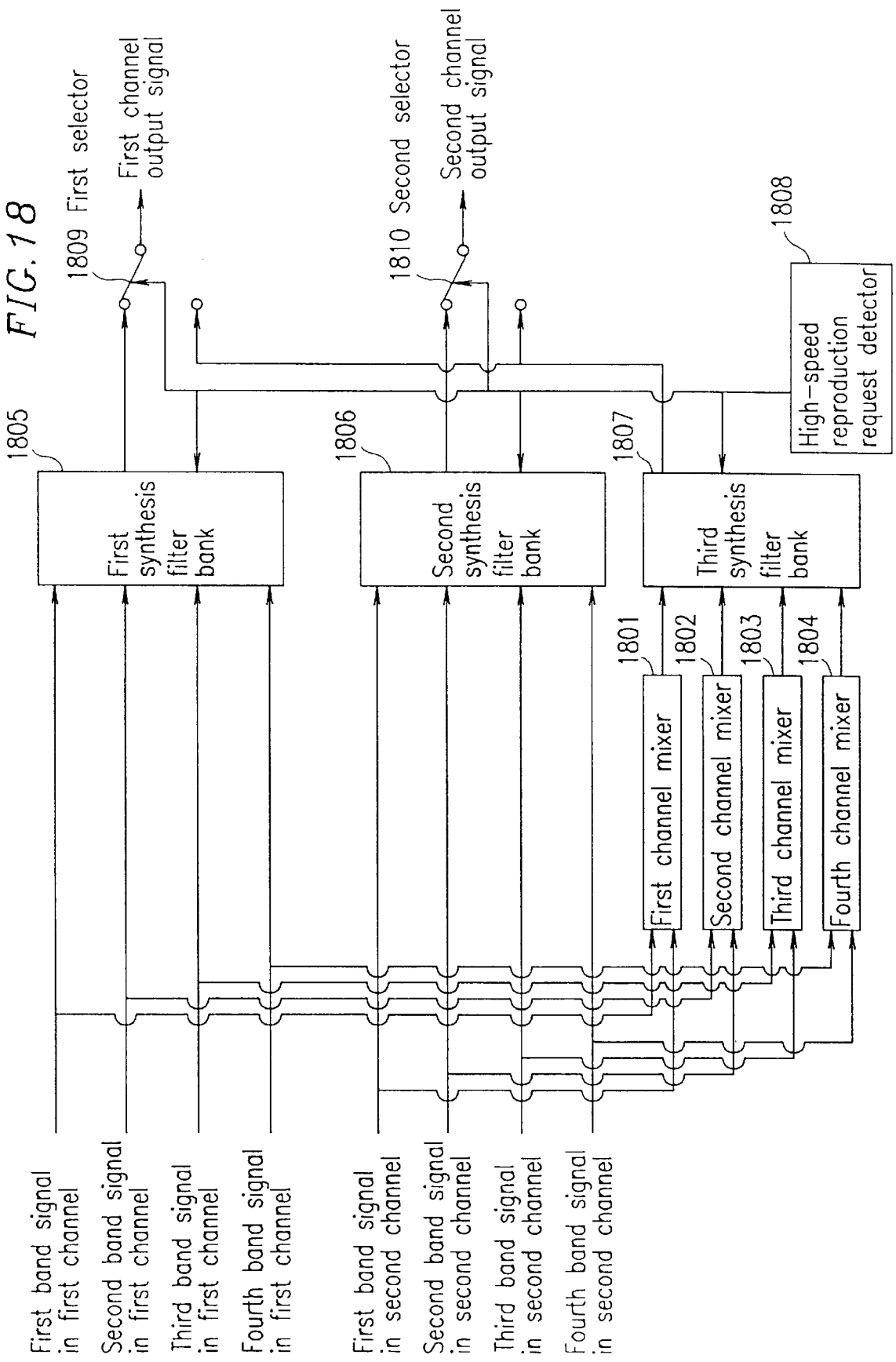
FIG. 18 is a block diagram showing a configuration for a reproducing apparatus in a fourth example of the present invention.

FIG. 18 is a block diagram showing a configuration for the reproducing apparatus in the fourth example of the present invention. In FIG. 18, the reference numeral 1801 denotes a first channel mixer for adding and averaging a first band signal on a first channel and a first band signal on a second channel; 1802 denotes a second channel mixer for adding and averaging a second band signal on the first channel and a second band signal on the second channel; 1803 denotes a third channel mixer for adding and averaging a third band signal on the first channel and a third band signal on the second channel; 1804 denotes a fourth channel mixer for adding and averaging a fourth band signal on the first channel and a fourth band signal on the second channel; 1805 denotes a first synthesis filter bank for band-synthesizing the first to the fourth band signals on the first channel; 1806 denotes a second synthesis filter bank for band-synthesizing the first to the fourth band signals on the second channel; 1807 denotes a third synthesis filter band for band-synthesizing the respective band signals output from the first to the fourth channel mixers 1801 to 1804; 1808 denotes a high-speed reproduction request detector for determining whether or not a high-speed reproducing request has been given by a user; 1809 denotes a first selector for selecting the output of the first synthesis filter bank 1805 as an output signal of the first channel when a high-speed reproduction request has not been given by a user or the output of the third synthesis filter bank 1807 as an output signal of the first channel when a high-speed reproduction request has been given by a user; and 1810 denotes a second selector for selecting the output of the second synthesis filter bank 1806 as an output channel of the second channel when a high-speed reproduction request has not been given by a user or the output of the third synthesis filter bank 1807 as an output signal of the second channel when a high-speed reproduction request has been given by a user.

In FIG. 18, it is assumed that the first to the fourth band signals to be input are band signals obtained by dividing a signal on a normal time axis into four band signals corresponding to the respective bands by a filter bank which performs a ¼ down sampling (i.e., a sampling for retaining one-fourth of the original samples and discarding or decimating the remaining samples) and that the first band signal is a band signal in the lowest band and the fourth band signal is a band signal in the highest band. In this example, an original signal is assumed to be divided into four band signals, for simplification. However, the number of band signals obtained by the band division is preferably several tens in the primary applications of the present invention. For example, the number of band signals is preferably 32 and each band-divided signal is preferably 1/32 down-sampled, as defined by the MPEG1 audio encoding method (see, for example, ISO/IEC 11172-3:1993).

Hereinafter, the operation of the reproducing apparatus having the above-described configuration will be described with reference to FIG. 18.

First, as shown in FIG. 18, the high-speed reproduction request detector 1808 determines whether or not a high-speed reproduction request has been given by a user. In the case where a high speed reproduction request has been given by the user, the first to the fourth channel mixers 1801 to 1804 add and average the corresponding band signals on the respective channels, thereby mixing the channels; the third synthesis filter bank 1807 band-synthesizes the channel-mixed band signals; and then the output signal of the third synthesis filter bank 1807 is output signal to two output lines via the first and the second selectors 1809 and 1810. On the other hand, in the case where a high-speed reproduction request has not been given by the user, the first synthesis filter bank 1805 band-synthesizes the first to the fourth band signals on the first channel; the output signal of the first synthesis filter bank 1805 is output to one of the two output lines via the first selector 1809; and the output signal of the second synthesis filter bank 1806 is output to the other output line via the second selector 1810.

As described above, the reproducing apparatus in the fourth example of the present invention includes: a first channel mixer for adding and averaging a first band signal on a first channel and a first band signal on a second channel; a second channel mixer for adding and averaging a second band signal on the first channel and a second band signal on the second channel; a third channel mixer for adding and averaging a third band signal on the first channel and a third band signal on the second channel; a fourth channel mixer for adding and averaging a fourth band signal on the first channel and a fourth band signal on the second channel; a first synthesis filter bank for band-synthesizing the first to the fourth band signal on the first channel; a second synthesis filter bank for band-synthesizing the first to the fourth band signals on the second channel; a third synthesis filter bank for band-synthesizing the respective band signals output from the first to the fourth channel mixers; a high-speed reproduction request detector for determining whether or not a high-speed reproduction request has been given by a user; a first selector for selecting the output of the first synthesis filter bank as an output signal of the first channel when a highs-speed reproduction request has not been given by the user, or the output of the third synthesis filter bank as an output signal of the first channel when a high-speed reproduction request has been given by the user; and a second selector for selecting the output of the second synthesis filter bank as an output signal of the second channel when a high-speed reproduction request has not been given by the user, or the output of the third synthesis filter bank as an output signal of the second channel when a high-speed reproduction request has been given by a user. In the reproducing apparatus, first, the high-speed reproduction request detector determines whether or not a high-speed reproduction request has been given by a user. In the case where a high-speed reproduction request has been given by the user, the first to the fourth channel mixers add and average the corresponding band signals on the respective channels, thereby mixing the channels; the third synthesis filter bank band-synthesizes the channel-mixed band signals; and then the waveform obtained after the band synthesis has been performed is output to two output lines via the first and the second selectors. On the other hand, in the case where a high-speed reproduction request has not been given by the user, the first synthesis filter bank band-synthesizes the first to the fourth band signals on the first channel; the second synthesis filter bank band-synthesizes the first to the fourth band signals on the second channel; the output waveform of the first synthesizes filter bank is output to one of the two output lines via the first selector; and the output signal of the second synthesis filter bank is output to the other output line via the second selector. As a result, the reproducing apparatus in the fourth example can deal with the increase in operation loads in the case of the high-speed reproducing operation, because the band synthesis is performed with respect to a smaller number of channels when the high-speed reproducing operation is performed. Furthermore, though the number of channels has been reduced, the information corresponding to the original number of channels has still been retained.

In this example, a specific method for performing high-speed reproduction processing has not been described. Of course, the amount of operation processing to be performed can be further reduced if the high-speed reproduction processing is performed before the band synthesis is performed as described in the first to the third examples.

To simplify the description, in this example, no limitation is applied to the respective band signals to be input. However, the effects of the present invention become particularly remarkable when the present invention is applied to a reproducing apparatus for reproducing an encoded signal which has been encoded by an encoding method in which an original signal conformable to multi-channel specifications is band-divided and then the respective band signals are encoded (e.g., MPEG1 audio encoding method). That is to say, according to the present invention, a band signal to be input is a band signal which has been extracted from a bit stream conformable to multi-channel specifications of MPEG1 audio encoded data and obtained by dequantizing the encoded data corresponding to each frequency band on each channel, in the case of the MPEG1 audio encoding method, for example. In such a case, the synthesis filter bank is a synthesis filter bank for synthesizing 32 band signals and the amount of operation processing to be performed by the filter bank becomes enormous. Thus, if the channels are mixed before the band synthesis is performed in accordance with the present invention, the amount of operation processing to be performed can be advantageously reduced considerably.

EXAMPLE 5

Hereinafter, a reproducing apparatus in a fifth example of the present invention will be described with reference to the drawings.

Figure 19:
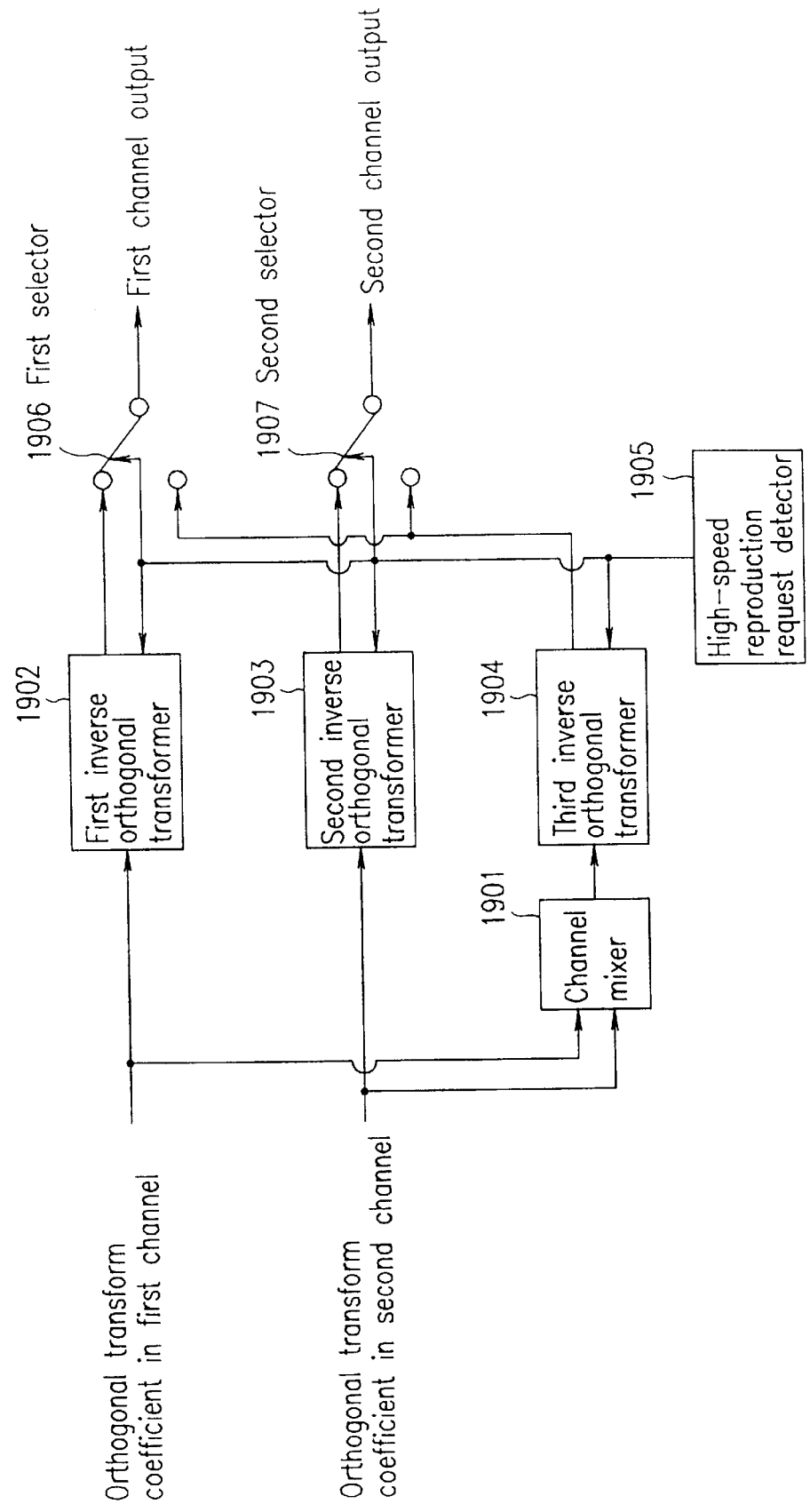
FIG. 19 is a block diagram showing a configuration for a reproducing apparatus in a fifth example of the present invention.

FIG. 19 is a block diagram showing a configuration for the reproducing apparatus in the fifth example of the present invention. In FIG. 19, the reference numeral 1901 denotes a channel mixer for adding and averaging input orthogonal transform coefficients corresponding to a first channel and a second channel; 1902 denotes a first inverse orthogonal transformer for performing an inverse transform with respect to the input orthogonal transform coefficient on the first channel; 1903 denotes a second inverse orthogonal transformer for performing an inverse orthogonal transform with respect to the input orthogonal transform coefficient on the second channel; 1904 denotes a third inverse orthogonal transformer for performing an inverse orthogonal transform with respect to the orthogonal transform coefficient output from the channel mixer 1901; 1905 denotes a high-speed reproduction request detector for determining whether or not a high-speed reproduction request has been given by a user; 1906 denotes a first selector for selecting the output of the first inverse orthogonal transformer 1902 as an output signal of the first channel when a high-speed reproduction request has not been given by the user or the output of the third inverse orthogonal transformer 1902 as an output signal of the first channel when a high-speed reproduction request has been given by the user; and 1907 denotes a second selector for selecting the output of the second inverse orthogonal transformer 1903 as an output signal of the second channel when a high-speed reproduction request has not been given by the user or the output of the third inverse orthogonal transfomer 1902 as an output signal of the second channel when a high-speed reproduction request has been given by the user.

Hereinafter, the operation of the reproducing apparatus having the above-described configuration will be described with reference to FIG. 19.

First, as shown in FIG. 19, the high-speed reproduction request detector 1905 determines whether or not a high-speed reproduction request has been given by a user. In the case where a high-speed reproduction request has been given by the user, the channel mixer 1901 adds and averages the corresponding orthogonal transform coefficients on the respective channels, thereby mixing the channels; the third inverse orthogonal transformer 1904 performs an inverse orthogonal transform with respect to the channel-mixed orthogonal transform coefficients; and then the output signal of the third inverse orthogonal transformer 1904 is output to two output lines via the first and the second selectors 1906 and 1907. On the other hand, in the case where a high-speed reproduction request has not been given by the user, the first inverse orthogonal transformer 1902 performs an inverse orthogonal transform with respect to the orthogonal transform coefficients on the first channel; the second inverse orthogonal transformer 1903 performs an inverse orthogonal transform with respect to the orthogonal transform coefficients on the second channel; the output signal of the first inverse orthogonal transformer 1902 is output to one of the two output lines via the first selector 1906; and the output signal of the second inverse orthogonal transformer 1903 is output to the other output line via the second selector 1907.

As described above, the reproducing apparatus in the fifth example of the present invention includes: a channel mixer for adding and averaging orthogonal transform coefficients corresponding to a first channel and a second channel; a first inverse orthogonal transformer for performing an inverse orthogonal transform with respect to the orthogonal transform coefficient on the first channel; a second inverse orthogonal transformer for performing an inverse orthogonal transform with respect to the orthogonal transform coefficient on the second channel; a third inverse orthogonal transformer for performing an inverse orthogonal transform with respect to the orthogonal transform coefficient output from the channel mixer; a high-speed reproduction request detector for determining whether or not a high-speed reproduction request has been given by a user; a first selector for selecting the output of the first inverse orthogonal transformer as an output of the third inverse orthogonal transformer as an output signal of the first channel when a high-speed reproduction request has not been given by the user or the output signal of the first channel when a high-speed reproduction request has been given by the user; and as second selector for selecting the output of the second inverse orthogonal transformer as an output signal of the third inverse orthogonal transformer as an output signal of the second channel when a high-speed reproduction request has not been given the user or the output signal of the second channel when a high-speed reproduction request has been given by the user. In the reproducing apparatus, first, the high-speed reproduction request detector determines whether or not a high-speed reproduction request has been given by a user. In the case where a high-speed reproduction request has been given by the user, the channel mixer adds and averages the corresponding orthogonal transform coefficients on the respective channels, thereby mixing the channels; the third inverse orthogonal transformer performs an inverse orthogonal transform with respect to the channel-mixed orthogonal transform coefficients; and then the output signal of the third inverse orthogonal transformer is output to two output lines via the first and the second selectors. On the other hand, in the case where a high-speed reproduction request has not been given by the user, the first inverse orthogonal transformer performs an inverse orthogonal transform with respect to the orthogonal transform coefficients on the first channel; the second inverse orthogonal transformer performs an inverse orthogonal transform with respect to the orthogonal transform coefficients on the second channel; the output signal of the first inverse orthogonal transfomer is output to one of the two output lines via the first selector; and the output signal of the second inverse orthogonal transformer is output to the other output line via the second selector. As a result, the reproducing apparatus in the fifth example can deal with the increase in operation loads in the case of the high-speed reproducing operation, because the inverse orthogonal transform processing is performed with respect to a smaller number of channels when the high-speed reproducing operation is performed. Furthermore, though the number of channels has been reduced, the information corresponding to the original number of channels has still been retained.

In this example, a method for performing high-speed reproduction processing is not limited to a specific method. For example, high-speed reproduction processing which has conventionally been widely performed may be performed after the compressed data is decoded into PCM data on a normal time axis in accordance with the method described in this example. In addition, as described in Japanese Laid-Open Patent Publication No. 4-315870, for example, the high-speed reproduction processing may be performed by a method in which a frequency is shifted by decimating one orthogonal transform coefficient out of several orthogonal transform coefficients during the orthogonal transform and then an inverse orthogonal transform is performed.

To simplify the description, in this example, no limitation is applied to the receptive band signals to be input. However, the effects of the present invention become particularly remarkable when the present invention is applied to a reproducing apparatus for reproducing an encoded signal which has been encoded by an encoding method in which an original signal comfortable to multi-channel specifications is subjected to an orthogonal transform in a frequency space and then each orthogonal transform coefficient is encoded (i.e., a transform encoding method such as Dolby AC3) (as to Dolby AC3, see Todd, C. et al., "AC3: Flexible Perocptual Coding for Audio Transmission and Storage", AES 96 the Convention, Preprint 3766, Fer. 1994).

That is to say, according to the present invention, each orthogonal transform coefficient to be input is an orthogonal transform coefficient which has been extracted from a bit stream conformable to multi-channel specifications of Dolby AC3 and obtained by dequantizing the encoded data corresponding to each orthogonal transform coefficient on each channel in the case of Dolby AC3, for example. In such a case, the amount of the inverse orthogonal transform processing to be performed becomes enormous. Thus, if the channels are mixed before the inverse orthogonal transform is performed in accordance with the present invention, the amount of the operation processing to be performed can be advantageously reduced considerably.

In this example, an orthogonal transform coefficient to be input is a coefficient obtained by a modified discrete cosine transform (MDCT) or a fast Fourier transform (FFT) and the first and the second inverse orthogonal transformers 1902 and 1903 are transformers performing the inverse transform of these transforms, for example.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reproducing apparatus for reproducing a plurality of band signals which have been subjected to a band division, comprising a time-scale modifier which receives the plurality of band signals and time-axis compresses the respective band signals at the same ratio, thereby outputting a plurality of time-axis compressed band signal and a synthesis filter bank for synthesizing the plurality of time-axis compressed band signals, wherein the time-scale modifier comprises a plurality of frame dividers, each of which receives a corresponding one of the plurality of band signals and divides the received band signal into a plurality of frames such that one frame has a predetermined sample length Tf and a plurality of cross faders, each of which performs cross fade processing with respect to a corresponding one of the plurality of frame-divided band signals by overlapping the band signal by a predetermined sample length Tc.

2. A reproducing apparatus according to claim 1, wherein the time-scale modifier further comprises a reproduction speed detector which detects a reproduction speed F input by a user for setting the sample length Tc based on the sample length Tf and the reproduction speed F such that Tc satisfies a relationship: Tc=Tf×(F−1)/F.

3. A reproducing apparatus according to claim 1, wherein the time-scale modifier further comprises a correlation function calculator for calculating a correlation value S(n) between a first half and a second half of the frame-divided band signal corresponding to a band, in which pitch components of a sound are included, when the first half and the second half are overlapped in an overlapping range defined by n samples, and wherein each of the plurality of cross faders uses n corresponding to a maximum value of S(n) as the sample length Tc.

4. A reproducing apparatus according to claim 3, wherein the time-scale modifier further comprises a reproduction speed detector which detects a reproduction speed F input by a user and a correlation function detecting range controller which calculates a sample length Tb satisfying a relationship: Tb=Tf×(F−1)/F and controls the correlation function calculator to obtain the correlation value S(n) in a range defined by (Tb±m) samples (where m is a natural number).

5. A reproducing apparatus according to claim 3, wherein the time-scale modifier further comprises a reproduction speed detector which detects a reproduction speed F input by a user and a correlation function detecting range controller which calculates a sample length Tb satisfying a relationship: Tb=Tf×(F−1)/F and controls the correlation function calculator to obtain the correlation value S(n) in a range defined by (Tb+B±m) samples (where m is a natural number) by using a speed fine control value B (where B is an integer), and wherein the correlation function detecting range controller updates the speed fine control value B by (B+Tb−Tc) every time the correlation function detecting range controller uses n corresponding to a maximum value of the correlation value S(n) as the sample length Tc and an initial value of the speed fine control value B is equal to 0.

6. A reproducing apparatus for reproducing a plurality of band signals which have been subjected to a band division, comprising a time-scale modifier which receives the plurality of band signals and time-axis compresses the respective band signals at the same ratio, thereby outputting a plurality of time-axis compressed band signals; and a synthesis filter bank for synthesizing the plurality of time-axis compressed band signals;

a plurality of frame dividers, each of which receives a corresponding one of the plurality of band signals and divides the received band signal into a plurality of frames such that one frame has a predetermined sample length Tf;

a repeating waveform detector which extracts a repeating waveform from a band signal corresponding to a band, in which pitch components of a sound are included, and determines a start Ts and an end point Te of the repeating waveform; and a plurality of decimators, each of which deletes a signal section between the start point Ts and the end point Te from the frame-divided band signal, thereby time-axis compressing the band signal.

7. A reproducing apparatus which receives a first band signal and a second band signal on a first channel and a first band signal and a second band signal on a second channel for outputting a first channel output signal and a second channel output signal which have been band-synthesized, comprising:

a first synthesis filter bank for receiving and band-synthesizing the first band signal and the second band signal on the first channel;

a second synthesis filter bank for receiving and band-synthesizing the first band signal and the second band signal on the second channel;

a first channel mixer which receives, adds and averages the first band signal on the first channel and the first band signal on the second channel, thereby outputting a mixed first band signal;

a second channel mixer which receives, adds and averages the second band signal on the first channel and the second band signal on the second channel, thereby outputting a mixed second band signal;

a third synthesis filter bank for receiving and band-synthesizing the mixed first band signal and the mixed second band signal;

a high-speed reproduction request detector for detecting a high-speed reproduction request given by a user;

a first selector for selectively outputting an output of the first synthesis filter band and an output of the third synthesis filter bank as the first channel output signal in accordnace with the high-speed reproduction request; and a second selector for selectively outputting an output of the second synthesis filter bank and an output of the third synthesis filter bank as the second channel output signal in accordance with the high-speed reproduction request.

8. A reproducing apparatus which receives an orthogonal transform coefficient on a first channel and an orthogonal transform coefficient on a second channel for outputting a first channel output signal and a second channel output signal which have been subjected to an inverse orthogonal transform, comprising:

a first inverse orthogonal transformer which receives the orthogonal transform coefficient on the first channel and performs an inverse orthogonal transform with respect to the orthogonal transform coefficient;

a second inverse orthogonal transformer which receives the orthogonal transform coefficient on the second channel and performs an inverse orthogonal transform with respect to the orthogonal transform coefficient;

a channel mixer which receives, adds and averages the orthogonal transform coefficient on the first channel and the orthogonal transform coefficient on the second channel, thereby outputting a mixed orthogonal transform coefficient;

a third inverse orthogonal transformer which receives the mixed orthogonal transform coefficient and performs and inverse orthogonal transform with respect to the orthogonal transform coefficient;

a high-speed reproduction request detector for detecting a high-speed reproduction request given by a user;

a first selector for selectively outputting an output of the first inverse orthogonal transformer and an output of the third inverse orthogonal transformer as the first channel output signal in accordance with the high-speed reproduction request; and a second selector for selectively outputting an output of the second inverse orthogonal transfomer and an output of the third inverse orthogonal transfomer as the second channel output signal in accordance with the high-speed reproduction request.

9. A reproducing apparatus for reproducing a plurality of band signals which have been subjected to a band division, comprising a time-scale modifier which receives the plurality of band signals and time-axis compresses the respective band signals at the same ratio, thereby outputting a plurality of time-axis compressed band signals and a synthesis filter bank for synthesizing the plurality of time-axis compressed band signals, wherein the time-scale modifier comprises:

a plurality of frame dividers, each of which receives a corresponding one of the plurality of band signals and divides the received band signal into a plurality of frames such that one frame has a predetermined sample length Tf.

* * * * *